(12) United States Patent
Baba et al.

(10) Patent No.: US 9,281,995 B2
(45) Date of Patent: Mar. 8, 2016

(54) VIRTUAL NETWORK AND MANAGEMENT METHOD OF VIRTUAL NETWORK

(71) Applicant: Hitachi, Ltd., Tokyo (JP)

(72) Inventors: Takashige Baba, Inagi (JP); Akihiko Takase, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/316,958

(22) Filed: Jun. 27, 2014

(65) Prior Publication Data

US 2014/0310393 A1    Oct. 16, 2014

Related U.S. Application Data

(63) Continuation of application No. 13/208,526, filed on Aug. 12, 2011, now abandoned.

(30) Foreign Application Priority Data

Oct. 7, 2010    (JP) .................................. 2010-227832

(51) Int. Cl.
*G06F 15/173*    (2006.01)
*H04L 12/24*    (2006.01)
(Continued)

(52) U.S. Cl.
CPC ............ *H04L 41/046* (2013.01); *H04L 41/022* (2013.01); *H04L 41/0806* (2013.01); *H04L 41/0853* (2013.01); *H04L 45/04* (2013.01); *H04L 45/60* (2013.01)

(58) Field of Classification Search
CPC . H04L 41/12; H04L 41/0803; H04L 12/4641; H04L 41/0806; H04L 41/0853; H04L 45/04; H04L 45/60; G06F 11/0712; G06F 9/5077

USPC ......... 709/201, 238, 223–224, 226, 232, 249, 709/250, 220, 246; 370/254

See application file for complete search history.

(56) References Cited

U.S. PATENT DOCUMENTS 7,307,990 B2    12/2007 Rosen et al.
7,415,507 B1    8/2008 Ward et al.
(Continued)

FOREIGN PATENT DOCUMENTS

GB    2 419 701 A    5/2006

OTHER PUBLICATIONS

European Search Report dated Nov. 15, 2011 {Eight (8) pages}.

*Primary Examiner* — Oanh Duong
(74) *Attorney, Agent, or Firm* — Crowell & Moring LLP

(57) ABSTRACT

There is a need to generate a virtual network across multiple physical networks without the need for users to understand information about the respective physical networks.
A network system includes: multiple communication systems for communication with a user; multiple physical network management servers that manage multiple physical networks including multiple routers; and a virtual network management server that manages a virtual network connecting the communication systems with each other through the physical networks. The virtual network management server acquires physical network configuration information. The virtual network management server generates management information in order to manage the physical networks as one abstraction network. The virtual network management server configures the abstraction network by transmitting the generated management information to each of the physical network management servers and the routers.

16 Claims, 37 Drawing Sheets

(51) Int. Cl.
*H04L 12/715* (2013.01)
*H04L 12/773* (2013.01)

(56) References Cited

U.S. PATENT DOCUMENTS

| | | | |
|---|---|---|---|
| 7,865,586 B2 | 1/2011 | Cohn | |
| 7,937,438 B1 | 5/2011 | Miller et al. | |
| 7,953,865 B1 | 5/2011 | Miller et al. | |
| 7,958,184 B2 * | 6/2011 | Barsness et al. | 709/201 |
| 7,991,859 B1 | 8/2011 | Miller et al. | |
| 8,046,480 B2 | 10/2011 | Cohn | |
| 8,194,680 B1 | 6/2012 | Brandwine et al. | |
| 8,224,931 B1 | 7/2012 | Brandwine et al. | |
| 8,224,971 B1 | 7/2012 | Miller et al. | |
| 8,230,050 B1 | 7/2012 | Brandwine et al. | |
| 8,370,834 B2 | 2/2013 | Edwards et al. | |
| 8,549,126 B2 | 10/2013 | Takeda et al. | |
| 8,559,324 B1 | 10/2013 | Brandwine et al. | |
| 2004/0210623 A1 * | 10/2004 | Hydrie et al. | 709/201 |
| 2005/0192969 A1 * | 9/2005 | Haga et al. | 707/10 |
| 2009/0187984 A1 * | 7/2009 | Archer et al. | 726/15 |
| 2009/0228541 A1 * | 9/2009 | Barsness et al. | 709/201 |
| 2009/0248846 A1 | 10/2009 | Cohn | |
| 2009/0248896 A1 | 10/2009 | Cohn | |
| 2009/0249473 A1 | 10/2009 | Cohn | |
| 2010/0085975 A1 | 4/2010 | Wang et al. | |
| 2010/0246443 A1 * | 9/2010 | Cohn et al. | 370/255 |
| 2011/0110268 A1 | 5/2011 | Panasyuk et al. | |

* cited by examiner

FIG. 8

405
USER REQUEST INFORMATION

| USER NAME (K902) | TRANSPORT FUNCTION (K903) | USER LOCATION (K904) | TRANSFER LOCATION (K905) |
|---|---|---|---|
| B | L2 NETWORK | CITY 1, CITY 2, CITY 4 | CITY 3 |

406
VIRTUAL NETWORK DEFINITION INFORMATION

| VIRTUAL NETWORK ID (K1002) | TRANSPORT FUNCTION (K1003) | USER LOCATION LID (K1004) | TRANSFER LOCATION LID (K1005) |
|---|---|---|---|
| 1002 | ETHERNET | 101, 102, 104 | 103 |

407
VIRTUAL NETWORK ALLOCATION INFORMATION

| VIRTUAL NETWORK ID (K1102) | USER NAME (K1103) |
|---|---|
| 1001 | A |
| 1002 | B |
| 1003 | C |
| ⋮ | ⋮ |

408
MAPPING INFORMATION

| VIRTUAL NETWORK ID (K1202) | TRANSPORT FUNCTION (K1203) | MAPPING INFORMATION | | 
|---|---|---|---|
| | | LOCATION LID (K1205) | ABSTRACT NODE ID (K1204) |
| 1002 | ETHERNET | 101 | 1 |
| | | 102 | 3 |
| | | 104 | 11 |
| | | 103 | 4, 10 |

409
ABSTRACTION LAYER INFORMATION

| ABSTRACT NODE ID (K1302) | TRANSPORT FUNCTION (K1303) | LID (K1304) | NETWORK GROUP (K1305) | PHYSICAL NETWORK CONNECTION (K1306) |
|---|---|---|---|---|
| 1 | ETHERNET, IP | 101 | 1 | – |
| 2 | ETHERNET, IP | 105 | 1 | 2 |
| 3 | ETHERNET, IP | 102 | 1 | – |
| 4 | ETHERNET, IP | 103 | 1 | 3 |
| 5 | ETHERNET | 107 | 2 | – |
| 6 | ETHERNET | 105 | 2 | 1 |
| 7 | ETHERNET | 106 | 2 | 3 |
| 8 | ETHERNET, IP | 106 | 3 | 2 |
| 9 | ETHERNET, IP | 108 | 3 | – |
| 10 | ETHERNET, IP | 103 | 3 | 1 |
| 11 | ETHERNET, IP | 104 | 3 | – |
| ⋮ | ⋮ | ⋮ | ⋮ | ⋮ |

T1301

503
ABSTRACTION LAYER INFORMATION

| PHYSICAL NODE ID | ABSTRACT NODE ID | TRANSPORT FUNCTION | LID | NETWORK GROUP |
|---|---|---|---|---|
| EDGE ROUTER a | 1 | ETHERNET, IP | 101 | 1 |
| EDGE ROUTER d | 2 | ETHERNET, IP | 105 | 1 |
| EDGE ROUTER b | 3 | ETHERNET, IP | 102 | 1 |
| EDGE ROUTER c | 4 | ETHERNET, IP | 103 | 1 |
| ⋮ | ⋮ | ⋮ | ⋮ | ⋮ |

FIG. 14B

504
PHYSICAL NETWORK CONFIGURATION INFORMATION

| | K1512 | K1513 | K1514 | K1515 | K1516 | K1517 | K1518 |
|---|---|---|---|---|---|---|---|
| T1511 → | NODE ID | TYPE | PROVISION LOCATION | ADJACENT NODE | TRANSPORT FUNCTION | LID | PHYSICAL NETWORK ADDRESS |
| | 01 | CORE | CITY 1 | 02 | ETHERNET, IP | 101 | A01 |
| | 02 | CORE | CITY 2 | 01, 03 | ETHERNET, IP | 102 | A02 |
| | 03 | EDGE | CITY 3 | 02 | ETHERNET, IP | 103 | A03 |
| | ... | ... | ... | ... | ... | ... | ... |

603
ABSTRACTION LAYER INFORMATION

| ABSTRACT NODE ID (K1402) | TRANSPORT FUNCTION (K1403) | LID (K1404) | NETWORK GROUP (K1405) | PHYSICAL NETWORK CONNECTION (K1406) |
|---|---|---|---|---|
| 4 | ETHERNET, IP | 103 | 1 | 3 |

T1401

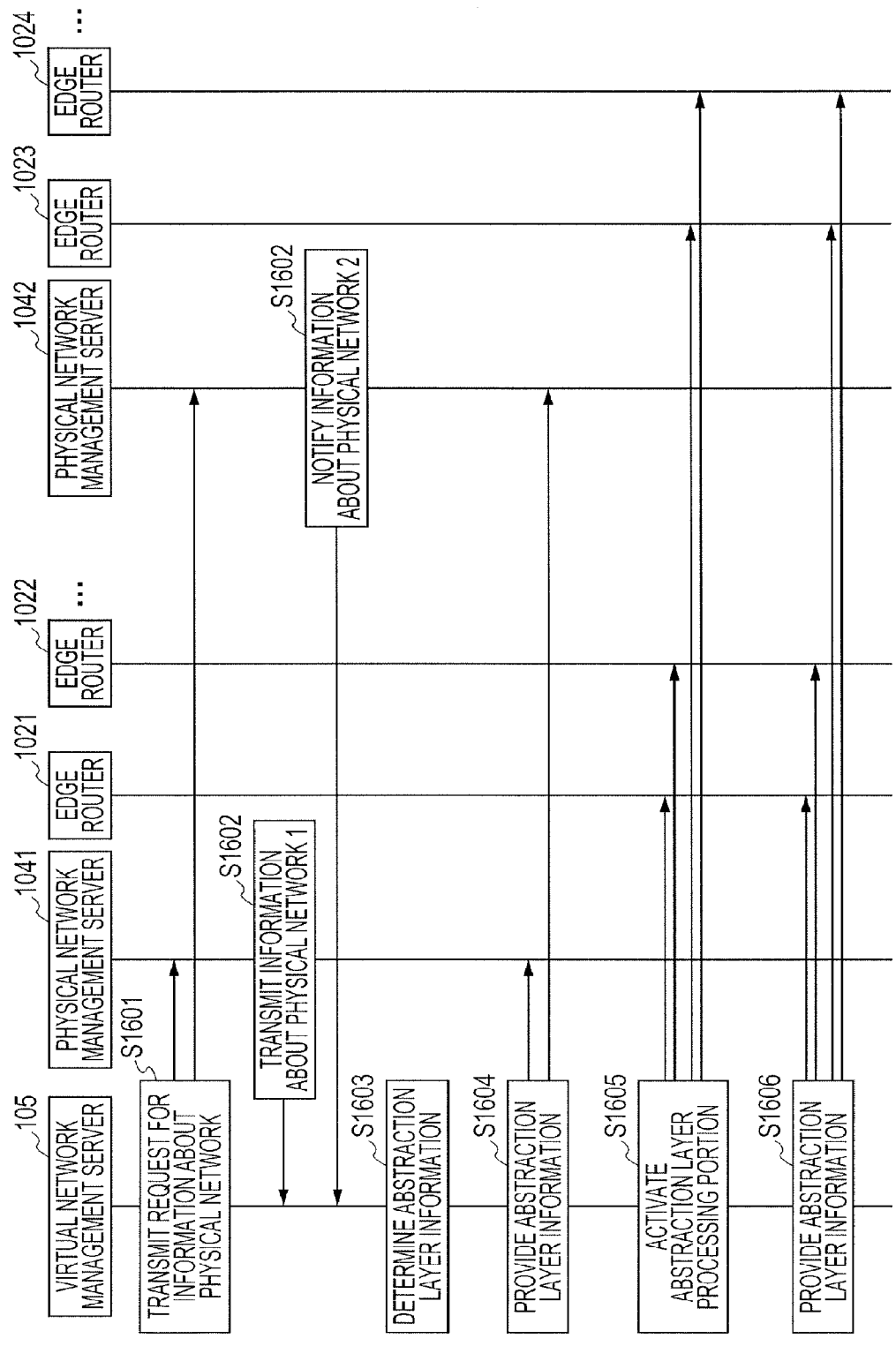

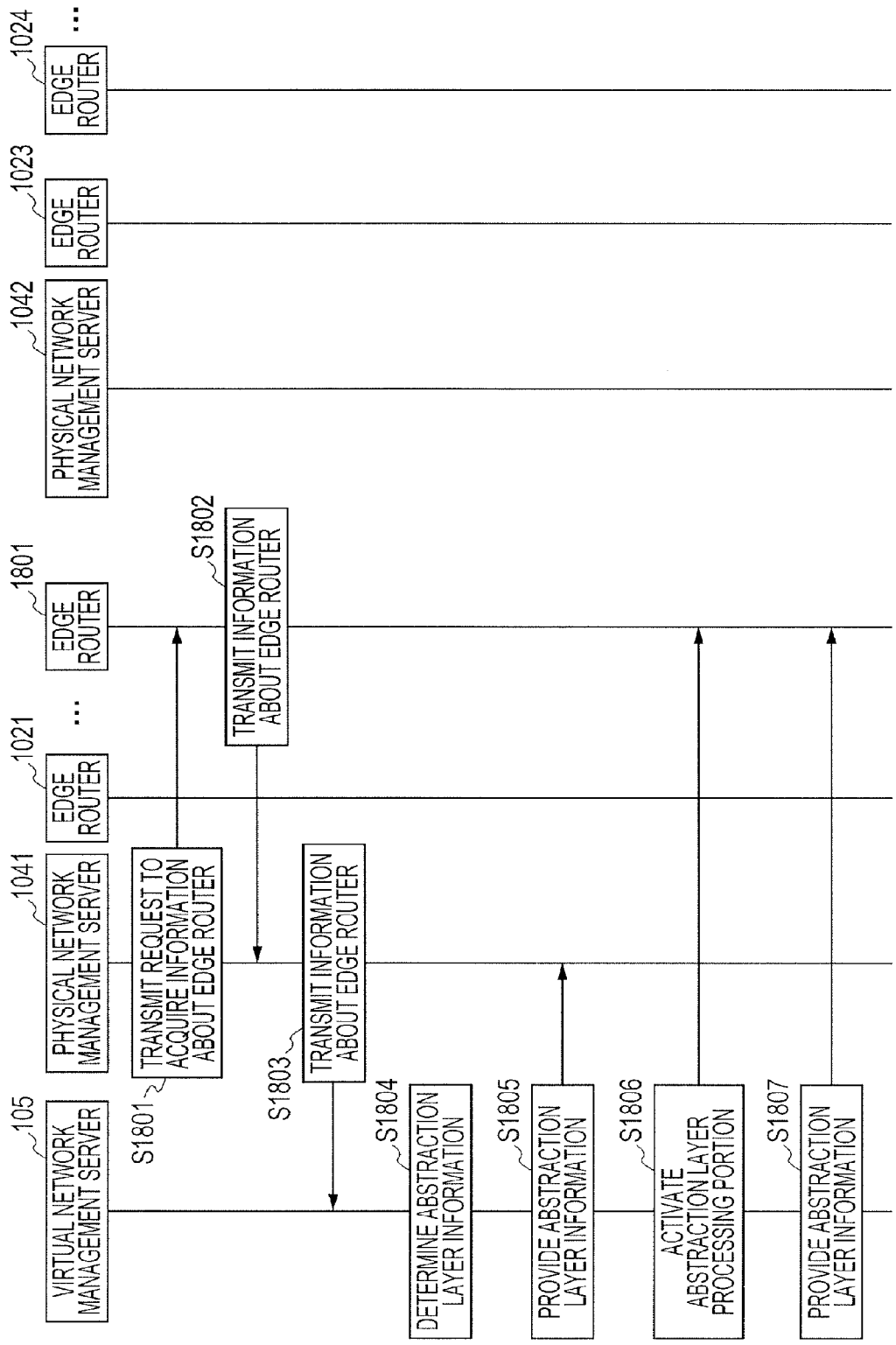

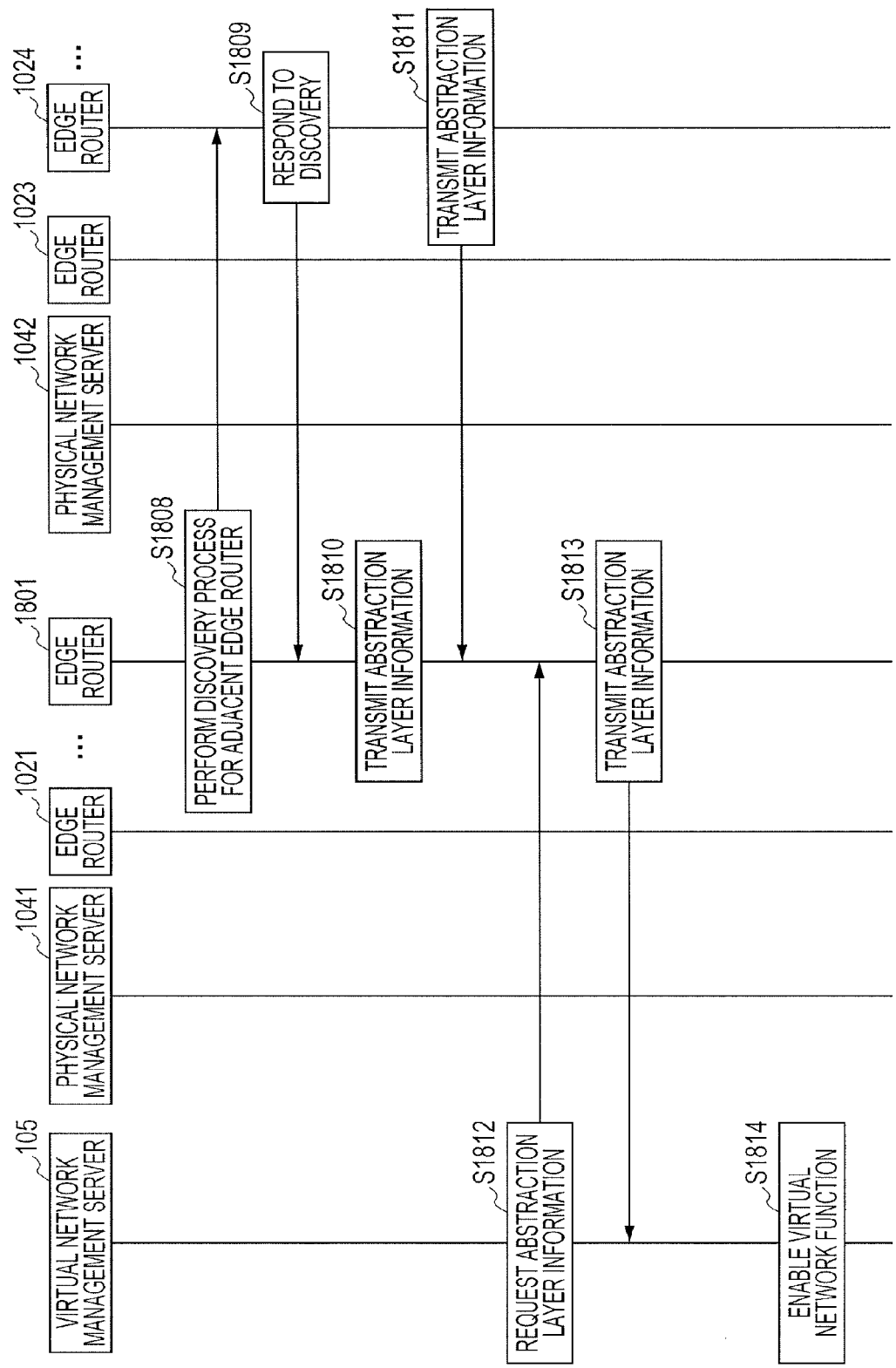

2103
ABSTRACTION LAYER ADDRESS CONVERSION INFORMATION

| ABSTRACTION LAYER ADDRESS | PHYSICAL NETWORK ADDRESS |
|---|---|
| D | A3 |
| E | B3 |
| ⋮ | ⋮ |

2104
ABSTRACTION LAYER ADDRESS CORRESPONDENCE INFORMATION

| MAC | ABSTRACTION LAYER ADDRESS |
|---|---|
| MAC1 | A3 |
| MAC2 | B3 |
| ⋮ | ⋮ |

FIG. 27

409 ABSTRACTION LAYER INFORMATION T2201

| ABSTRACT NODE ID K1302 | TRANSPORT FUNCTION K1303 | LID K1304 | NETWORK GROUP K1305 | PHYSICAL NETWORK CONNECTION K1306 | ABSTRACTION LAYER ADDRESS K2202 |
|---|---|---|---|---|---|
| 1 | ETHERNET, IP | 101 | 1 | – | A |
| 2 | ETHERNET, IP | 105 | 1 | 2 | – |
| 3 | ETHERNET, IP | 102 | 1 | – | B |
| 4 | ETHERNET, IP | 103 | 1 | 3 | – |
| 5 | ETHERNET | 107 | 2 | – | C |
| 6 | ETHERNET | 105 | 2 | 1 | – |
| 7 | ETHERNET | 106 | 2 | 3 | – |
| 8 | ETHERNET, IP | 106 | 3 | 2 | – |
| 9 | ETHERNET, IP | 108 | 3 | 1 | D |
| 10 | ETHERNET, IP | 103 | 3 | – | – |
| 11 | ETHERNET, IP | 104 | 3 | – | E |
| ... | ... | ... | ... | ... | ... |

FIG. 35

409
ABSTRACTION LAYER INFORMATION

| K1302 ABSTRACT NODE ID | K1303 TRANSPORT FUNCTION | K1304 LID | K1305 NETWORK GROUP | K1306 PHYSICAL NETWORK CONNECTION | K3502 VIRTUAL FUNCTION |
|---|---|---|---|---|---|
| 1 | ETHERNET, IP | 101 | 1 | – | – |
| 2 | ETHERNET, IP | 105 | 1 | 2 | – |
| 3 | ETHERNET, IP | 102 | 1 | – | – |
| 4 | ETHERNET, IP | 103 | 1 | 3 | – |
| 5 | ETHERNET | 107 | 2 | – | – |
| 6 | ETHERNET | 105 | 2 | 1 | – |
| 7 | ETHERNET | 106 | 2 | 3 | – |
| 8 | ETHERNET, IP | 106 | 3 | 2 | – |
| 9 | ETHERNET, IP | 108 | 3 | 1 | – |
| 10 | ETHERNET, IP | 103 | 3 | – | – |
| 11 | ETHERNET, IP | 104 | – | – | – |
| 101 | ETHERNET, IP | – | 1 | – | VIRTUAL L3 SWITCH |
| 102 | ETHERNET, IP | – | 1 | – | VIRTUAL SERVER |
| ... | ... | ... | ... | ... | ... |

405
USER REQUEST INFORMATION

| USER NAME (K902) | TRANSPORT FUNCTION (K903) | USER LOCATION (K904) | TRANSFER LOCATION (K905) | VIRTUAL FUNCTION (K3202) |
|---|---|---|---|---|
| B | L2 NETWORK | CITY 1, CITY 2, CITY 4 | CITY 3 | ROUTER FUNCTION, VM FUNCTION |

406
VIRTUAL NETWORK DEFINITION INFORMATION

| VIRTUAL NETWORK ID (K1002) | TRANSPORT FUNCTION (K1003) | USER LOCATION LID (K1004) | TRANSFER LOCATION LID (K1005) | VIRTUAL FUNCTION (K3302) |
|---|---|---|---|---|
| 1002 | ETHERNET | 101, 102, 104 | 103 | VIRTUAL L3 SWITCH, VIRTUAL SERVER |

408
MAPPING INFORMATION

T3401

| K1202 | K1203 | K1205 MAPPING INFORMATION | K1204 | K3403 VIRTUAL FUNCTION MAPPING INFORMATION | K3404 |
|---|---|---|---|---|---|
| VIRTUAL NETWORK ID | TRANSPORT FUNCTION | LOCATION LID | ABSTRACT NODE ID (K1206) | VIRTUAL FUNCTION | ABSTRACT NODE ID |
| 1002 | ETHERNET | 101 | 1 | VIRTUAL L3 SWITCH | 101 |
| | | 102 | 3 | VIRTUAL SERVER | 102 |
| | | 104 | 11 | | |
| | | 103 | 4, 10 | | |

FIG. 39

503
ABSTRACTION LAYER INFORMATION

T3701

| PHYSICAL NODE ID (K1502) | ABSTRACT NODE ID (K1503) | TRANSPORT FUNCTION (K1504) | LID (K1505) | NETWORK GROUP (K1506) | VIRTUAL FUNCTION (K3702) |
|---|---|---|---|---|---|
| EDGE ROUTER a | 1 | ETHERNET, IP | 101 | 1 | — |
| EDGE ROUTER d | 2 | ETHERNET, IP | 105 | 1 | — |
| EDGE ROUTER b | 3 | ETHERNET, IP | 102 | 1 | — |
| EDGE ROUTER c | 4 | ETHERNET, IP | 103 | 1 | — |
| ROUTER e | 101 | ETHERNET, IP | — | 1 | VIRTUAL L3 SWITCH |
| ROUTER f | 102 | ETHERNET, IP | — | 1 | VIRTUAL SERVER |
| ... | ... | ... | ... | ... | ... |

603
ABSTRACTION LAYER INFORMATION

| ABSTRACT NODE ID (K1402) | TRANSPORT FUNCTION (K1403) | LID (K1404) | NETWORK GROUP (K1405) | PHYSICAL NETWORK CONNECTION (K1406) | VIRTUAL FUNCTION (K3602) |
|---|---|---|---|---|---|
| 101 | ETHERNET, IP | 103 | 1 | – | VIRTUAL L3 SWITCH |

T3601

VIRTUAL NETWORK AND MANAGEMENT METHOD OF VIRTUAL NETWORK

CROSS REFERENCE TO RELATED APPLICATIONS

This application is a continuation of U.S. application Ser. No. 13/208,526, filed Aug. 12, 2011, which claims priority from Japanese patent application JP 2010-227832 filed on Oct. 7, 2010, the disclosures of which are expressly incorporated by reference herein.

FIELD OF THE INVENTION

The present invention relates to a virtual network technology that enables multiple users to share the network and to configure logical networks independent of each other. More particularly, the invention relates to a virtual network management method for physical networks using different control methods.

BACKGROUND OF THE INVENTION

A wide area network service provides communication services that connect information systems for users including companies at distant locations such as cities. The information technology for corporate jobs has remarkably advanced in recent years. Various types of information are computerized and are exchanged between corporate locations through communication.

To satisfy the above-mentioned demand, there is an increasing trend to use wide-area Ethernet (registered trademark) easily connectable with user information systems at low costs or IP-VPN or other IP/Ethernet-based wide-area network services (e.g., see U.S. Pat. No. 7,307,990).

An IP/Ethernet-based wide-area network provides easy connectivity with user locations using a router apparatus (hereafter referred to as a router) based on IP as a network standard protocol and Ethernet technologies used for user information systems.

The 10 Gbps broadband transmission technology is used as an interface for connection between routers. The IP/Ethernet-based wide-area network can provide services at low costs while allowing users to share the broadband interface.

The IP/Ethernet-based wide-area network is configured as a physical network including core routers as a basis for the wide-area network and edge routers to connect user locations. The following description assumes the physical network to be a basic network for the wide-area network.

The edge router encapsulates a communication packet used for communication between user locations. A core network header is added to the communication packet and is used for communication in the core network. A router in the core network references the core network header to transfer a communication packet. Communication is available using the wide-area network without modifying an original communication packet from the user.

A user identification label for identifying a user is attached to the core network header in order to share the wide-area network among users. Routers in the core network and edge routers form a virtual private network for each user based on the user identification label in the core network header. The security is ensured in order to prevent confusion in communication packets exchanged between users.

Improvement of wide-area network services changes functions to be supplied and users' utilization forms.

The wide-area network services provide diversified types of communication protocols to be encapsulated during encapsulation of user communication packets and server and network functions separated for each of users.

The users' utilization forms now include communication between the data center of a service provider or a contents provider and a corporate user location in addition to the conventional communication between corporate user locations.

SUMMARY OF THE INVENTION

As described above, the wide-area network configuration becomes complicated in accordance with changes in functions supplied from the wide-area network services and users' utilization forms. The network management method needs to configure a virtual network, i.e., a virtual private network across multiple physical networks using different network protocols operating on the router apparatuses.

The following problems arise when the virtual network is configured across multiple physical networks.

Management software called a network management system manages physical networks individually. In terms of a virtual network to be configured, respective physical networks differ from each other in methods of managing supplied functions and names, methods of managing physical network locations, and methods of keeping correspondence between a network address at the user location and an address in the physical network.

A virtual network and a physical network must be associated with each other using different techniques for respective physical networks. Conversion between the virtual network and the physical network becomes complicated. The size of a conversion table increases while a server for managing the virtual network and an edge router in the physical network manage the conversion table. There are problems in that a virtual network cannot be generated instantly and operating and managing the virtual network increases costs.

Objects of the invention may be readily ascertained by referring to the following description and appended drawings.

The following describes representative examples of the present invention. A network system includes: multiple communication systems for communication with a user; multiple physical network management servers that manage multiple physical networks including multiple routers; and a virtual network management server that manages a virtual network as a logical network connecting the communication systems with each other through the physical networks. The physical network management servers each include a first processor, first memory connected to the first processor, and a first network interface connected to the first processor. The virtual network management server includes a second processor, second memory connected to the second processor, and a second network interface connected to the second processor. Each of the physical network management servers connects with the virtual network management server. The virtual network management server acquires physical network configuration information indicating a configuration of the physical network from each of the physical network management servers. The virtual network management server generates abstraction network management information based on the acquired physical network configuration information in order to manage the physical networks as one abstraction network. The virtual network management server transmits the generated abstraction network management information to each of the physical network management servers and each of the routers and configure the abstraction network. The virtual network management server receives a virtual network generation request containing input information about the communication system and the router and converts the input information into virtual network definition information for generating the virtual network. The virtual network management server selects the router for configuring the virtual network based on the abstraction network management information and the virtual network definition information. The virtual network management server generates virtual network setting information for configuring the virtual network. The virtual network management server transmits the generated virtual network setting information to the selected router to configure the virtual network.

According to the present embodiment, multiple physical networks are managed as a single abstraction network. A virtual network is generated across multiple physical networks while the virtual network management server can generate information about the virtual network by converting information about the physical network into information about the abstraction network. Accordingly, a user can easily and instantly generate the virtual network without needing to understand respective physical network configurations.

BRIEF DESCRIPTION OF THE DRAWINGS

FIG. 8 is an explanatory diagram illustrating an example of user request information according to the first embodiment of the invention;

FIG. 9 is an explanatory diagram illustrating an example of virtual network definition information according to the first embodiment of the invention;

FIG. 10 is an explanatory diagram illustrating an example of virtual network allocation information according to the first embodiment of the invention;

FIG. 11 is an explanatory diagram illustrating mapping information according to the first embodiment of the invention;

FIG. 12 is an explanatory diagram illustrating an example of abstraction layer information according to the first embodiment of the invention;

FIG. 14B is an explanatory diagram illustrating an example of physical network configuration information according to the first embodiment of the invention;

FIG. 17A is a flowchart illustrating an example of an initialization process for the virtual network system according to the first embodiment of the invention;

FIG. 19A is a flowchart illustrating an example of a virtual network system changing process performed when an edge router is added to the virtual network system according to the first embodiment of the invention;

FIG. 19B is a flowchart illustrating an example of a virtual network system changing process performed when an edge router is added to the virtual network system according to the first embodiment of the invention;

FIG. 27 is an explanatory diagram illustrating an example of abstraction layer information according to the second embodiment of the invention;

FIG. 35 is an explanatory diagram illustrating an example of abstraction layer information according to the third embodiment of the invention;

FIG. 36 is an explanatory diagram illustrating an example of user request information according to the third embodiment of the invention;

FIG. 37 is an explanatory diagram illustrating an example of virtual network definition information according to the third embodiment of the invention;

FIG. 38 is an explanatory diagram illustrating mapping information according to the third embodiment of the invention;

FIG. 39 is an explanatory diagram illustrating an example of abstraction layer information according to the third embodiment of the invention;

DETAILED DESCRIPTION OF THE PREFERRED EMBODIMENTS

Figure 1:
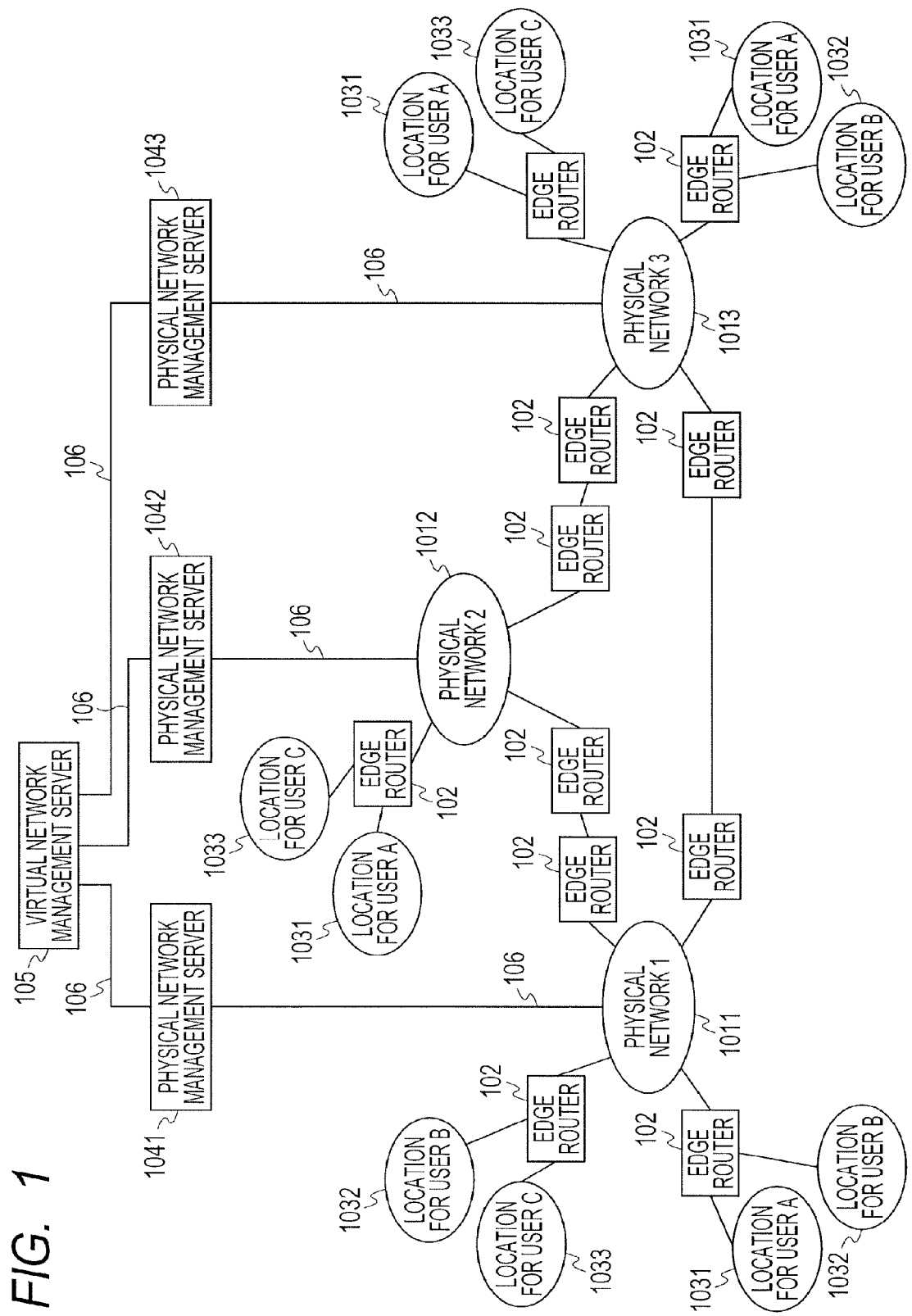
FIG. 1 is a block diagram illustrating a configuration example of the physical network as a basis for a virtual network system according to a first embodiment of the invention.

Embodiments of the present invention will be described in further detail with reference to the accompanying drawings. Throughout the drawings illustrating the embodiments, the same configurations are depicted by the same reference numerals as a general rule and a detailed description is omitted for simplicity.

First Embodiment

The following describes a virtual network system according to the first embodiment of the invention.

Figure 2:
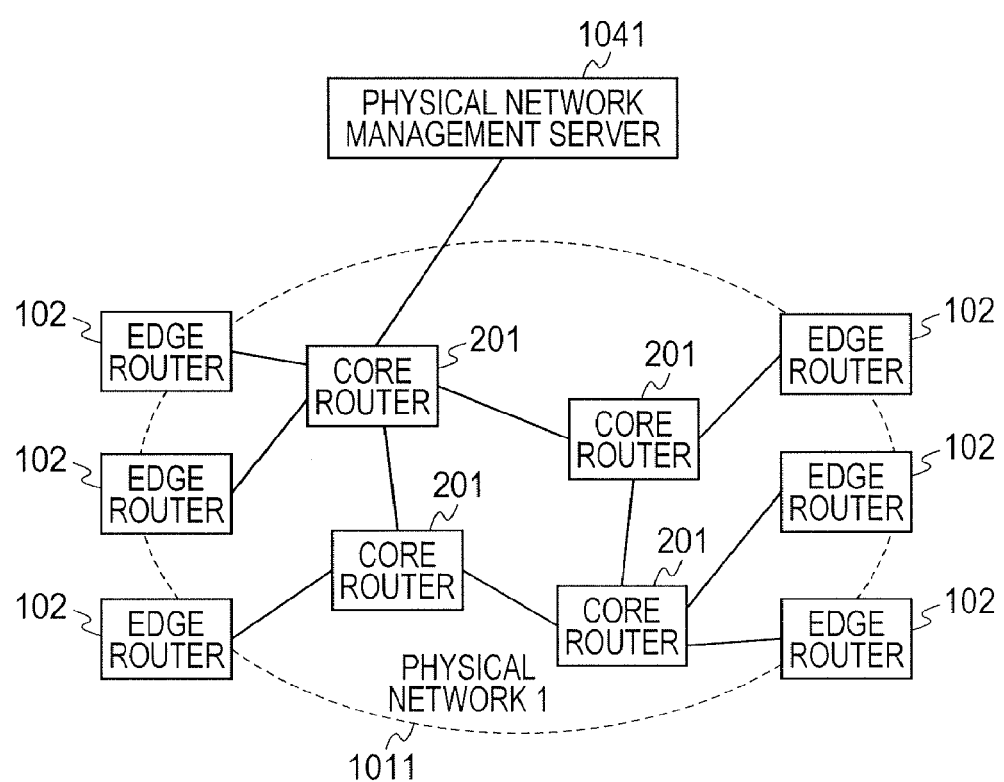
FIG. 2 is a block diagram illustrating a configuration of the physical network according to the first embodiment of the invention.

The virtual network system includes one or more physical networks as a basis. With reference to FIGS. 1 through 3, the following describes a configuration of the physical network as a basis for the virtual network system according to the first embodiment of the invention.

FIG. 1 is a block diagram illustrating a configuration example of the physical network as a basis for a virtual network system according to the first embodiment of the invention.

As shown in FIG. 1, the virtual network system according to the embodiment includes multiple physical networks 1 (1011), 2 (1012), and 3 (1013). The physical networks 1011, 1012, and 1013 are connected to each other through edge routers 102 provided at edges of the physical networks 1011, 1012, and 1013.

In FIG. 1, the physical networks 1011, 1012, and 1013 are all connected to each other for simplicity. The configuration of the physical networks 1011, 1012, and 1013 will be described later with reference to FIG. 2.

Through the edge routers 102, the physical networks 1011, 1012, and 1013 are connected to user locations each containing a communication system of a user who uses the virtual network system.

FIG. 1 shows connections of a user location 1031 for user A, a user location 1032 for user B, and a user location 1033 for user C for simplicity. The user location 1031 for user A may or may not use the same configuration for the physical networks 1011, 1012, and 1013. The same applies to the user location 1032 for user B and the user location 1033 for user C.

The virtual network system includes a physical network management server 1041 for managing the physical network 1 (1011), a physical network management server 1042 for managing the physical network 2 (1012), and a physical network management server 1043 for managing the physical network 3 (1013).

The virtual network system includes a virtual network management server 105 that manages the entire virtual network system.

The physical network management servers 1041, 1042, and 1043 are respectively connected to the physical networks 1011, 1012, and 1013 through a management network 106. The virtual network management server 105 is connected to the physical network management servers 1041, 1042, and 1043 through the management network 106.

The physical networks 1011, 1012, and 1013 use different methods of configuring a virtual network. The physical network management server 1041, 1042, and 1043 use different methods to manage the virtual network.

For example, the physical networks 1011, 1012, and 1013 can use MPLS (Multi-Protocol Label Switching), IEEE802.1Q Tag-VLAN, and IEEE802.1ah EoE (Ethernet over Ethernet) as methods of configuring and managing the virtual network.

The following describes internal configurations of the physical networks 1011, 1012, and 1013.

In the following description, a physical network 101 represents the physical networks 1011, 1012, and 1013 unless needed to be distinguished from each other. A physical network management server 104 represents the physical network management servers 1041, 1042, and 1043 unless needed to be distinguished from each other. A user location 103 represents user locations 1031, 1032, and 1033 unless needed to be distinguished from each other.

FIG. 2 is a block diagram illustrating a configuration of the physical network 101 according to the first embodiment of the invention. The example of FIG. 2 shows the configuration of the physical network 1 (1011)

The physical network 1 (1011) includes an edge router 102 and a core router 201. The edge router 102 is provided at the edge of the physical network 1 (1011). The core router 201 connects between edge routers 102.

As described above, the physical network 1 (1011) connects with the physical network management server 1041. In the example of FIG. 2, the physical network 1 (1011) connects with the core router 201 included in the physical network 1 (1011) and the physical network management server 1041.

The physical network management server 1041 can communicate with all core routers 201 and all edge routers 102 that configure the physical network 1 (1011) through the management network 106. The physical network management server 1041 controls the core routers 201 and the edge routers 102 through the management network 106.

Figure 3A:
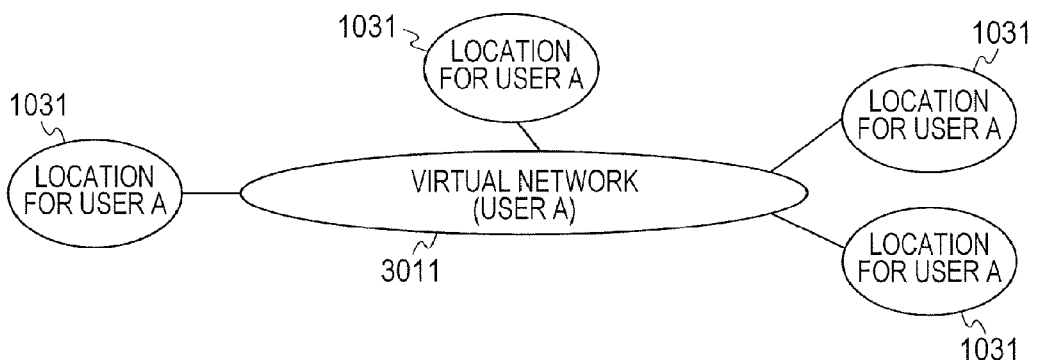
FIG. 3A is an explanatory diagram illustrating an example configuration of the virtual network in the virtual network system according to the first embodiment of the invention.
Figure 3B:
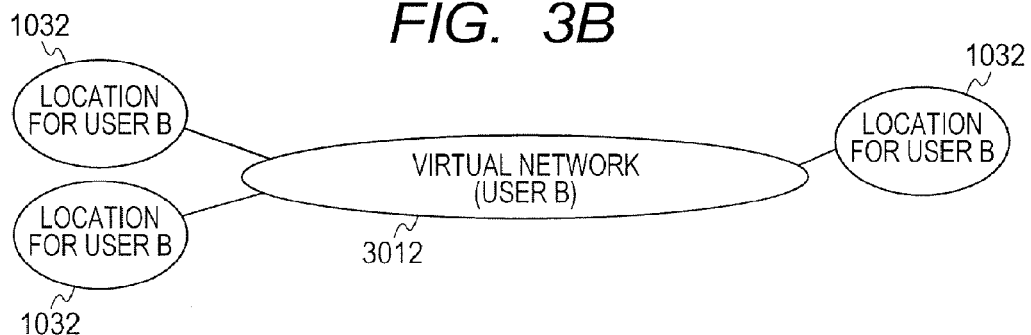
FIG. 3B is an explanatory diagram illustrating another example configuration of the virtual network in the virtual network system according to the first embodiment of the invention.
Figure 3C:
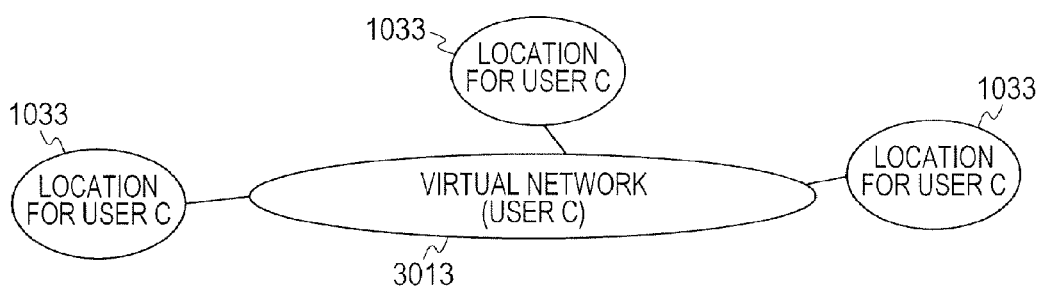
FIG. 3C is an explanatory diagram illustrating still another example configuration of the virtual network in the virtual network system according to the first embodiment of the invention.

FIGS. 3A, 3B, and 3C are explanatory diagrams illustrating example configurations of the virtual network in the virtual network system according to the first embodiment of the invention.

According to the embodiment, the virtual network system configures the virtual network for each user.

FIG. 3A is an explanatory diagram illustrating a virtual network 3011 for user A. FIG. 3B is an explanatory diagram illustrating a virtual network 3012 for user B. FIG. 3C is an explanatory diagram illustrating a virtual network 3013 for user C. In the following description, a virtual network 301 represents the virtual networks 3011, 3012, and 3013 unless needed to be distinguished from each other.

As shown in FIGS. 3A through 3C, the user-based virtual network 301 independently connects with the user locations 103 for corresponding users. That is, the virtual network 301 is provided as a logically divided network for each of users.

For example, a virtual network for user A is configured on the physical network 101 in order to generate the virtual network 3011 for user A. Virtual networks for user A configured on the physical networks 101 are connected through the edge routers 102 to configure a virtual network across the physical networks 101. The user-A virtual networks are connected to the user-A locations 1031 through the edge routers 102 to configure the virtual network 3011 shown in FIG. 3.

The embodiment assumes that the independent virtual networks 301 are allocated to users. Instead, the virtual network may be allocated to each service supplied from a carrier or service provider or to each application owned by a user.

The following describes hardware configurations of the physical network management server 104, the virtual network management server 105, and the edge router 102.

The virtual network management server 105 includes a processor (not shown), memory (not shown), a nonvolatile storage medium (not shown), and a network interface (not shown). These components are connected through an internal bus (not shown). The virtual network management server 105 may be configured otherwise.

Executing programs stored in the memory (not shown) can provide functions of the virtual network management server 105. The configuration of software supplied for the virtual network management server 105 will be described later with reference to FIG. 5.

The physical network management server 104 includes a processor (not shown), memory (not shown), a nonvolatile storage medium (not shown), and a network interface (not shown). These components are connected through an internal bus (not shown). The physical network management server 104 may be configured otherwise.

Executing programs stored in the memory (not shown) can provide functions of the physical network management server 104. The configuration of software supplied for the physical network management server 104 will be described later with reference to FIG. 13.

Figure 4:
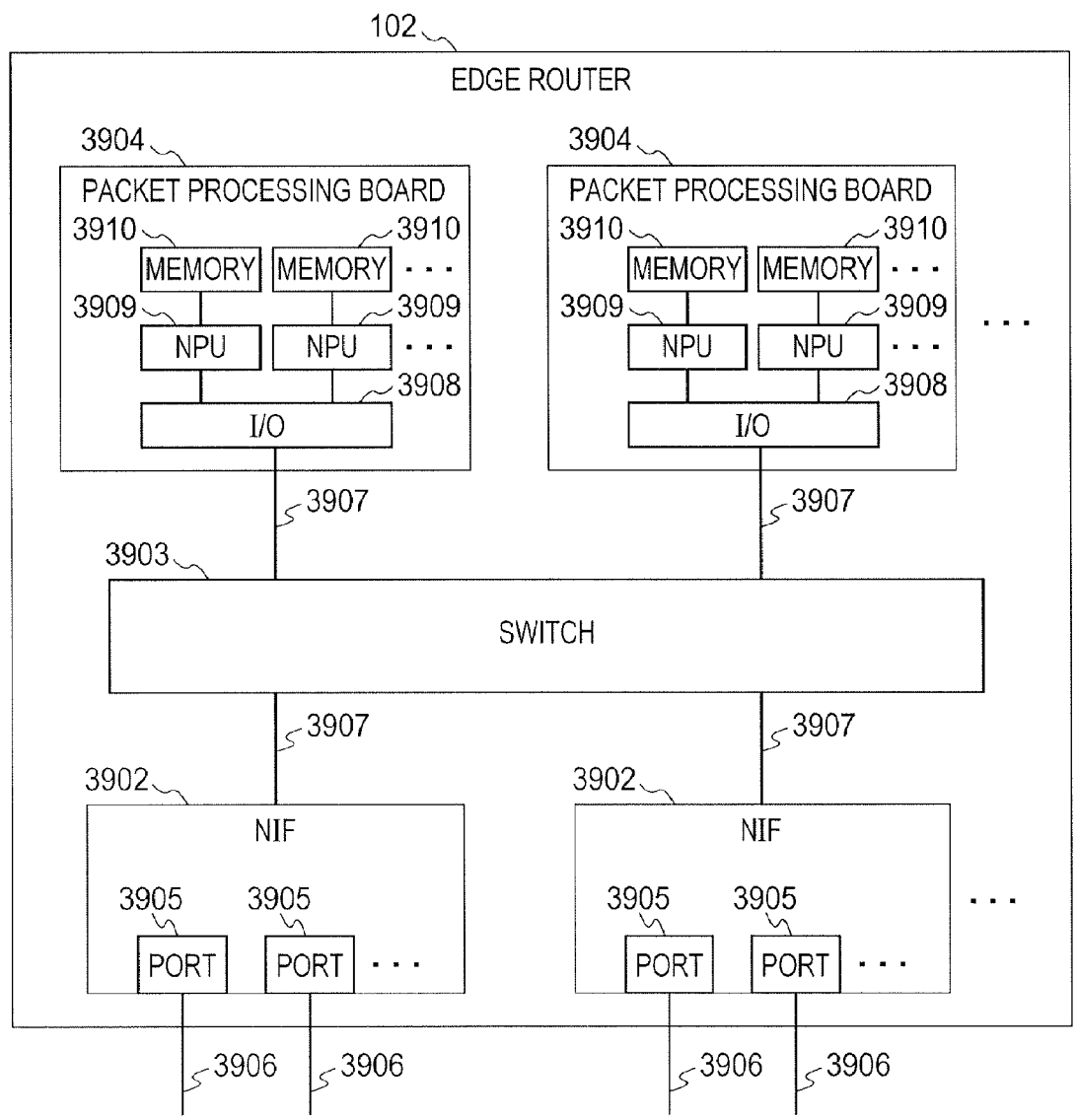
FIG. 4 is a block diagram illustrating a hardware configuration of an edge router according to the first embodiment of the invention.

FIG. 4 is a block diagram illustrating a hardware configuration of the edge router 102 according to the first embodiment of the invention.

The edge router 102 includes a packet processing board 3904, a switch 3903, and a network interface (NIF) 3902.

The network interface (NIF) 3902 enables communication with external apparatuses and includes a port (PORT) 3905 for external communication. The port 3905 connects with a communication cable 3906 such as an optical cable or a metal cable.

The switch 3903 connects the network interface (NIF) 3902 with the packet processing board 3904 through an internal wiring 3907. This connection can communicate communication packets and control information in apparatuses with each other.

The packet processing board 3904 processes communication packets. For example, the packet processing board 3904 includes a network processor (NPU) 3909 as a programmable processor, memory 3910, and an interface (I/O) 3908 for connection with the switch 3903. The packet processing board 3904 may include more than one network processor (NPU) 3909 and memory 3910.

The edge router 102 may include one packet processing board 3904 or more and one network interface (NIF) 3902 or more.

The software configuration for the edge router 102 will be described later with reference to FIG. 15.

Figure 5:
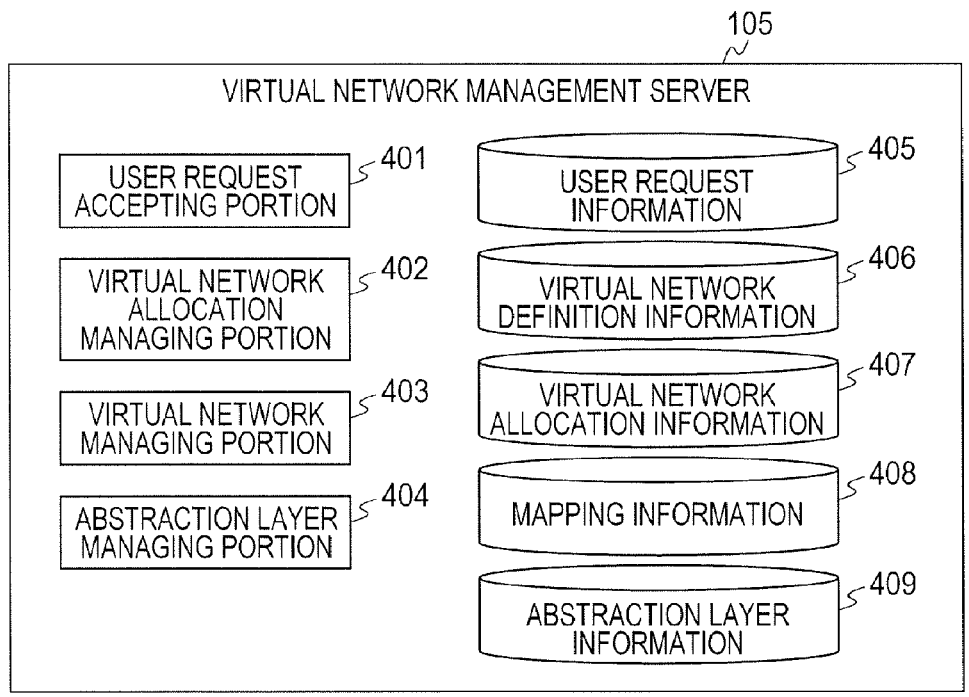
FIG. 5 is a block diagram illustrating a software configuration of a virtual network management server according to the first embodiment of the invention.

FIG. 5 is a block diagram illustrating a software configuration of the virtual network management server 105 according to the first embodiment of the invention.

The virtual network management server 105 includes a user request accepting portion 401, a virtual network allocation managing portion 402, a virtual network managing portion 403, and an abstraction layer managing portion 404 as function blocks.

The virtual network management server 105 maintains user request information 405, virtual network definition information 406, virtual network allocation information 407, mapping information 408, and abstraction layer information 409 as virtual network system management information.

The user request accepting portion 401 accepts a user request to generate, delete, or change the virtual network 301 from an operator who manages the virtual network. The following description assumes the operator to be a person who manages the virtual network.

Specifically, the user request accepting portion 401 accepts a user request that contains configuration information for configuring the virtual network 301. The user request accepting portion 401 stores that configuration information in user request information 405. The user request accepting portion 401 converts information stored in the user request information 405 into abstraction layer information and stores the abstraction layer information in virtual network definition information 406.

Figure 6:
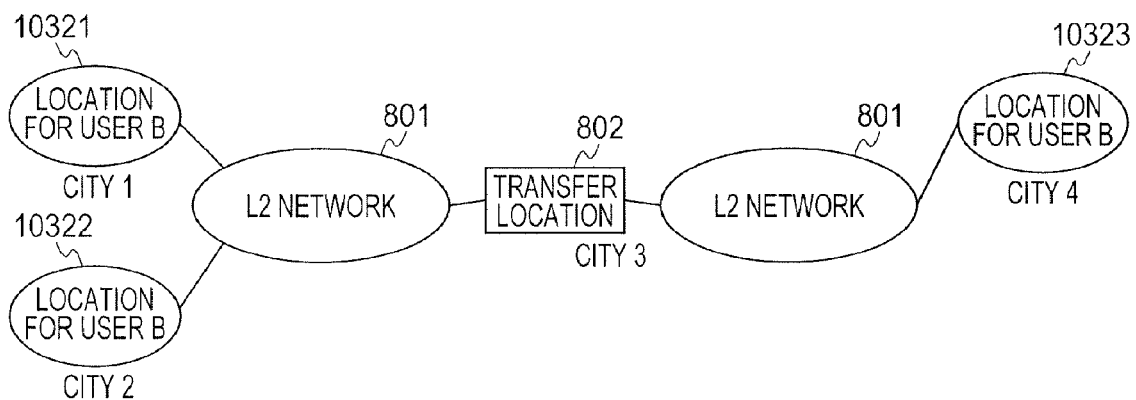
FIG. 6 is an explanatory diagram illustrating an example of a virtual network generated from a user request according to the first embodiment of the invention.

The operator requests to generate the virtual network 301 by transmitting a user request containing configuration information as shown in FIG. 6, for example.

FIG. 6 is an explanatory diagram illustrating an example of the virtual network 301 generated from a user request according to the first embodiment of the invention. FIG. 6 shows configuration information for generating the virtual network 3012 for user B.

According to the example in FIG. 6, the user location 1032 for user B includes city 1 (10321), city 2 (10322), and city 4 (10323). An L2 network 801 provides communication among the user locations 10321, 10322, and 10323. A transfer location 802 is provided in city 3 and enables or disables communication between the L2 networks 801.

In this example, information indicating places is equivalent to city names such as city 1, city 2, and city 3. Information indicating the transport function is equivalent to the L2 network. Generally, however, the operator-requested configuration information about the virtual network 301 depends on service types using the virtual network 301. For example, information indicating places includes identifiers specific to the physical networks 101, unique names, geographical names, and city names. Information indicating the transport function includes network layer names such as L2 and L3, protocol type names such as Ethernet and IP, and technical names for virtual networks such as MPLS and EoE.

Now let us return to the description of FIG. 5.

The virtual network allocation managing portion 402 manages allocation of the virtual network 301 based on the virtual network definition information 406 and the abstraction layer information 409. Specifically, the virtual network allocation managing portion 402 maps the virtual network 301 to the physical networks 101 while the virtual network 301 is allocated to the user. The virtual network allocation managing portion 402 then stores the mapping result in the mapping information 408.

The virtual network managing portion 403 manages the virtual network 301 configured in the virtual network system. Specifically, the virtual network managing portion 403 acquires necessary information from the physical network management servers 104 and the edge routers 102 and controls the configuration of the virtual network 301 based on the acquired information.

The abstraction layer managing portion 404 manages the virtual network system as an abstraction network. The abstraction network is described below.

Figure 7:
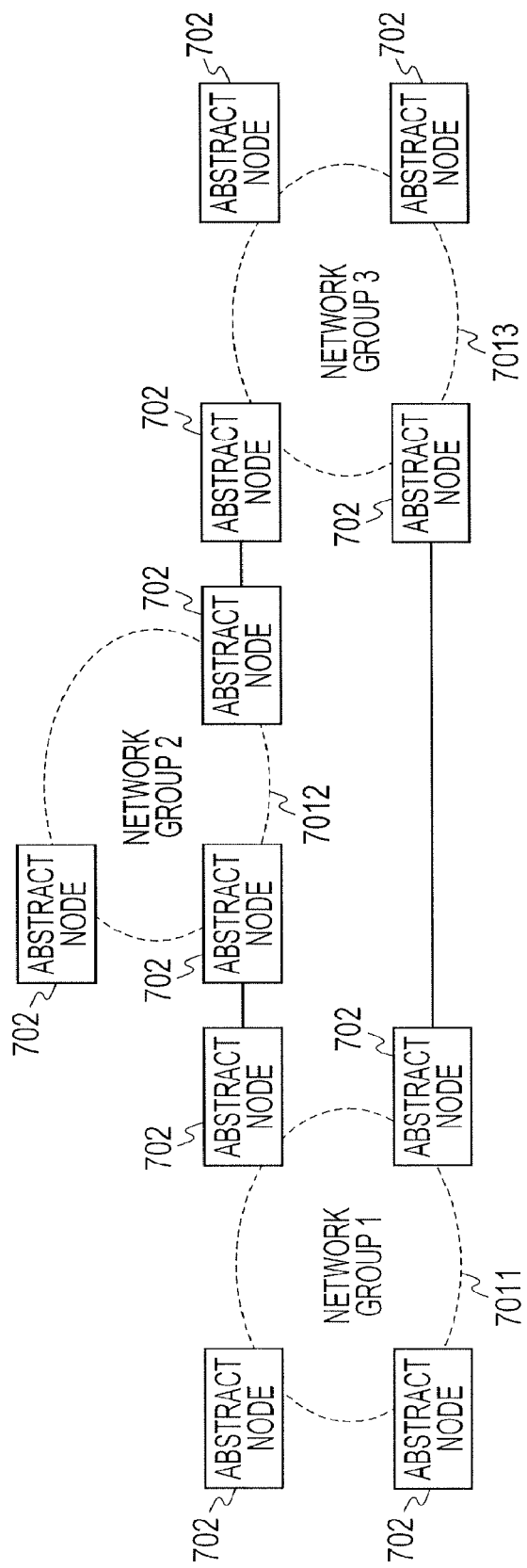
FIG. 7 is an explanatory diagram illustrating an abstraction network generated from abstracting the virtual network system according to the first embodiment of the invention.

FIG. 7 is an explanatory diagram illustrating an abstraction network generated from abstracting the virtual network system according to the first embodiment of the invention.

The abstraction network uses the edge routers 102 connecting the physical networks 101 in the virtual network system and manages the edge routers 102 as a common abstract node 702 in one network. The abstract node 702 corresponding to the edge routers 102 belonging to the same physical network 101 is managed as a network group in order to manage which physical network 101 includes the edge router 102 corresponding to the abstract node 702.

In the example of FIG. 7, the physical network 1 (1011) belongs to a network group 1 (7011). The physical network 2 (1012) belongs to a network group 2 (7012). The physical network 3 (1013) belongs to a network group 3 (7013). A network group 701 represents the network groups 7011, 7012, and 7013 unless needed to be distinguished from each other.

According to the invention, the virtual network system including multiple physical networks 101 is configured as one abstraction network including the abstract node 702 and the network group 701.

In one embodiment, the invention provides abstraction layer information between information about the physical network 101, as shown in FIG. 6, and information about the virtual network 301. The abstraction layer information can be used to easily manage mapping between the physical network 101 and the virtual network 301.

Now let us return to the description of FIG. 5.

The user request information 405 stores configuration information contained in a user request accepted from the operator. The user request information 405 will be described in detail with reference to FIG. 8.

The virtual network definition information 406 stores the abstraction layer information that is equivalent to a converted version of information stored in the user request information 405. The virtual network definition information 406 will be described in detail with reference to FIG. 9.

The virtual network allocation information 407 stores correspondence relation between the virtual network 301 and the user. The virtual network allocation information 407 will be described in detail with reference to FIG. 10.

The mapping information 408 stores a result of mapping the virtual network 301 to the abstraction network. The mapping information 408 will be described in detail with reference to FIG. 11.

The abstraction layer information 409 stores configuration information about the abstraction network. The abstraction layer information 409 will be described in detail with reference to FIG. 12.

According to the embodiment, processes to be described later manage the virtual network system including multiple physical networks 101 as one network, i.e., the abstraction network.

The following describes information maintained in the virtual network management server 105.

FIG. 8 is an explanatory diagram illustrating an example of the user request information 405 according to the first embodiment of the invention. The example in FIG. 8 stores configuration information for generating the virtual network 3012 shown in FIG. 6.

The embodiment represents the user request information 405 as tabular data T901.

The user request information 405 contains a user name (K902), a transport function (K903), a user location (K904), and a transfer location (K905).

The user name (K902) stores information for identifying a user to whom the virtual network 301 is allocated.

The transport function (K903) stores information for identifying a protocol type used for the virtual network 301.

The user location (K904) stores information for identifying the user location 103. The embodiment stores a city name.

The transfer location (K905) stores information for identifying a transfer location. The embodiment stores a city name.

As shown in FIG. 8, the user request information 405 stores information needed to configure the user-requested virtual network 301.

FIG. 9 is an explanatory diagram illustrating an example of the virtual network definition information 406 according to the first embodiment of the invention.

The embodiment represents the virtual network definition information 406 as tabular data T1001.

The virtual network definition information 406 contains a virtual network ID (K1002), a transport function (K1003), a user location LID (K1004), and a transfer location LID (K1005).

The virtual network ID (K1002) stores an identifier for identifying the virtual network 301.

The transport function (K1003) stores information for identifying a protocol type used for the virtual network 301. The transport function (K1003) equals the transport function (K903).

The user location LID (K1004) stores an LID (Location ID), i.e., an identifier that represents the user location as information about the abstract layer.

The transfer location LID (K1005) stores an LID, i.e., an identifier that represents the transfer location as information about the abstract layer.

As shown in FIG. 9, the virtual network definition information 406 stores information resulting from converting information about the physical network 101 into information about the abstraction network.

FIG. 10 is an explanatory diagram illustrating an example of the virtual network allocation information 407 according to the first embodiment of the invention.

The embodiment represents the virtual network allocation information 407 as tabular data T1101.

The virtual network allocation information 407 contains a virtual network ID (K1102) and a user name (K1103).

The virtual network ID (K1102) stores an identifier for identifying the virtual network 301. The virtual network ID (K1102) equals the virtual network ID (K1002).

The User name (K1103) stores information for identifying a user to whom the virtual network 301 is allocated. The user name (K1103) equals the user name (K902).

FIG. 11 is an explanatory diagram illustrating the mapping information 408 according to the first embodiment of the invention. The mapping information 408 in FIG. 11 stores information about the virtual network 3012 to be allocated to user B.

The embodiment represents the mapping information 408 as tabular data T1201.

The mapping information 408 contains a virtual network ID (K1202), a transport function (K1203), and mapping information (K1204).

The virtual network ID (K1202) stores an identifier for identifying the virtual network 301. The virtual network ID (K1202) equals the virtual network ID (K1002).

The transport function (K1203) stores information for identifying a protocol type used for the virtual network 301. The transport function (K1203) equals the transport function (K903).

The mapping information (K1204) stores information indicating correspondence relation between the abstract node 702 and the user location or the transfer location allocated to the virtual network 301. Specifically, the mapping information (K1204) contains a location LID (K1205) and an abstract node ID (K1206).

The location LID (K1205) stores an LID that represents the user location or the transfer location as abstraction layer information. The abstract node ID (K1206) stores an identifier for identifying an abstract node 702 to which the location LID (K1205) is mapped.

According to the example in FIG. 11, the transport function (K1203) stores "Ethernet" as a protocol used for the virtual network 3012 allocated to user B.

The location LID (K1205) of mapping information K1204 stores "101" indicating user location 10321 for city 1 in FIG. 8. The corresponding abstract node ID (K1206) of the mapping information K1204 stores "1".

The location LID (K1205) of the mapping information K1204 stores "102" indicating user location 10322 for city 2 in FIG. 8. The corresponding abstract node ID (K1206) of the mapping information K1204 stores "3".

The location LID (K1205) of the mapping information K1204 stores "104" indicating user location 10323 for city 3 in FIG. 8. The corresponding abstract node ID (K1206) of the mapping information K1204 stores "11". The location LID (K1205) of the mapping information K1204 stores "103" indicating transfer location 802 for city 3 in FIG. 8. The corresponding abstract node ID (K1206) of the mapping information K1204 stores "4" and "10".

As shown in FIG. 11, the mapping information 408 stores information about the abstraction network and information about the virtual network associated with each other.

FIG. 12 is an explanatory diagram illustrating an example of the abstraction layer information 409 according to the first embodiment of the invention.

The embodiment represents the abstraction layer information 409 as tabular data T1301.

The abstraction layer information 409 includes an abstract node ID (K1302), a transport function (K1303), an LID (K1304), a network group (K1305), and a physical network connection (K1306).

The abstract node ID (K1302) stores an identifier for identifying the abstract node 702.

The transport function (K1303) stores a protocol type available for the abstract node 702 corresponding to the abstract node ID (K1302).

The LID (K1304) stores identification information indicating a place that is included in the abstraction network and is used to provide the abstract node 702 corresponding to the abstract node ID (K1302).

The network group (K1305) stores an identifier for identifying the network group 701 to which the abstract node 702 corresponding to the abstract node ID (K1302) belongs.

The physical network connection (K1306) stores an identifier for identifying the adjacent physical network 101 connected to the abstract node 702 corresponding to the abstract node ID (K1302).

As a feature of the invention, the edge routers 102 are included in each of the physical networks 101 configuring the virtual network system and are indivisibly managed as the common abstract node 702 in the abstraction network as shown in FIG. 12.

The abstraction network configuration only requires at least one of the transport function (K1303) and the LID (K1304).

The following describes the software configuration of the physical network management server 104.

Figures 13, 14A:
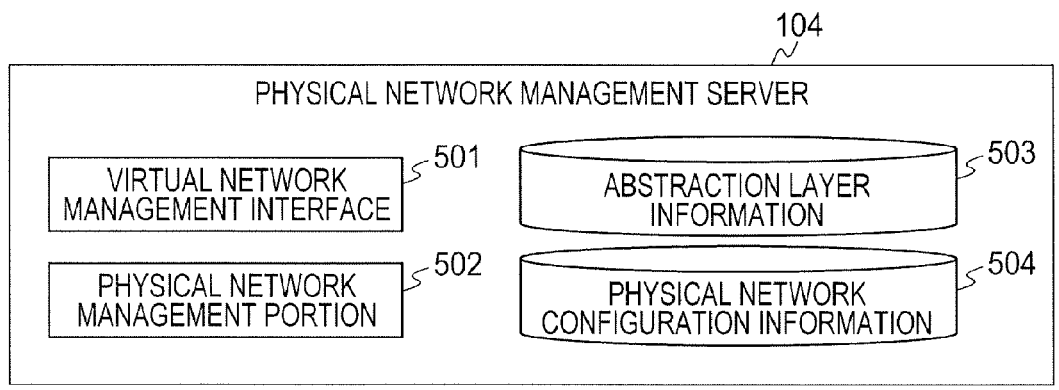
FIG. 13 is a block diagram illustrating software configuration of a physical network management server according to the first embodiment of the invention.
FIG. 14A is an explanatory diagram illustrating another example of abstraction layer information according to the first embodiment of the invention.

FIG. 13 is a block diagram illustrating the software configuration of the physical network management server 104 according to the first embodiment of the invention.

The physical network management server 104 includes a virtual network management interface 501 and a physical network management portion 502 as function blocks.

The physical network management server 104 maintains abstraction layer information 503 and physical network configuration information 504 as management information about the physical network 101.

The virtual network management interface 501 enables communication with the virtual network management server 105. The virtual network management interface 501 transmits the configuration information about the physical network 101 to the virtual network management server 105. The virtual network management interface 501 receives control information for generating, deleting, or modifying the virtual network 301 or information about the abstraction network from the virtual network management server 105.

The physical network management portion 502 provides management needed to configure the virtual network 301 on the physical network 101 to which the physical network management server 104 is connected for management.

To configure the virtual network 301, the physical network management portion 502 acquires configuration information about the edge router 102 and the core router 201 in the physical network 101 and provides the edge router 102 and the core router 201 with information for configuring the virtual network 301.

The physical network configuration information 504 stores information for managing the virtual network 301.

The abstraction layer information 503 stores configuration information about an abstraction network. The abstraction layer information 503 will be described in detail with reference to FIG. 14A.

The physical network configuration information 504 stores configuration information about the edge router 102 and the core router 201 for the physical network 101 managed by the physical network management server 104. The physical network configuration information 504 will be described in detail with reference to FIG. 14B.

The physical network management portion 502 and the physical network configuration information 504 manage the physical network 101. The respective physical networks 101 use different management methods.

The virtual network management interface 501 and the abstraction layer information 503 are one of the features of the invention and allow the virtual network management server 105 to generate the virtual network 301 across multiple physical networks 101.

FIG. 14A is an explanatory diagram illustrating another example of the abstraction layer information 503 according to the first embodiment of the invention. The abstraction layer information 503 in FIG. 14A is maintained in the physical network management server 1041 that manages the physical network 1 (1011).

The embodiment represents the abstraction layer information 503 as tabular data T1501.

The abstraction layer information 503 includes a physical node ID (K1502), an abstract node ID (K1503), a transport function (K1504), an LID (K1505), and a network group (K1506).

The physical node ID (K1502) stores an identifier for identifying a physical node such as the edge router 102 in the physical network 1 (1011).

The abstract node ID (K1503) stores an identifier for identifying a physical node corresponding to the ID (K1502) as the abstract node 702 in an abstraction layer.

The transport function K1504 stores a protocol type available for a physical node corresponding to the physical node ID (K1502).

The LID (K1505) stores an identifier indicating a place that is provided with a physical node corresponding to the physical node ID (K1502) in the abstraction network.

The network group (K1506) stores an identifier for identifying the network group 701 containing a physical node corresponding to the physical node ID (K1502) in the abstraction network.

FIG. 14B is an explanatory diagram illustrating an example of the physical network configuration information 504 according to the first embodiment of the invention.

The physical network configuration information 504 includes a node ID (K1512), a type (K1513), a provision location (K1514), an adjacent node (K1515), a transport function (K1516), an LID (K1517), and a physical network address (K1518).

The node ID (K1512) stores an identifier for identifying a physical node such as the edge router 102 in the physical network 1 (1011).

The type (K1513) stores the type of a physical node corresponding to the node ID (K1512).

The provision location (K1514) stores information indicating a location where a physical node corresponding to the node ID (K1512) in the physical network 101.

The adjacent node (K1515) stores an identifier of another physical node adjacent to a physical node corresponding to the node ID (K1512).

The transport function (K1516) stores a protocol type available for a physical node corresponding to the node ID (K1512).

The LID (K1517) is identification information indicating the provision location of a physical node corresponding to the node ID (K1512). For example, the LID (K1517) provides identification information settled when the physical network 101 is configured.

The physical network address (K1518) provides address information of a physical node corresponding to the node ID (K1512).

The software configuration of the edge router 102 is described below.

Figures 15, 16:
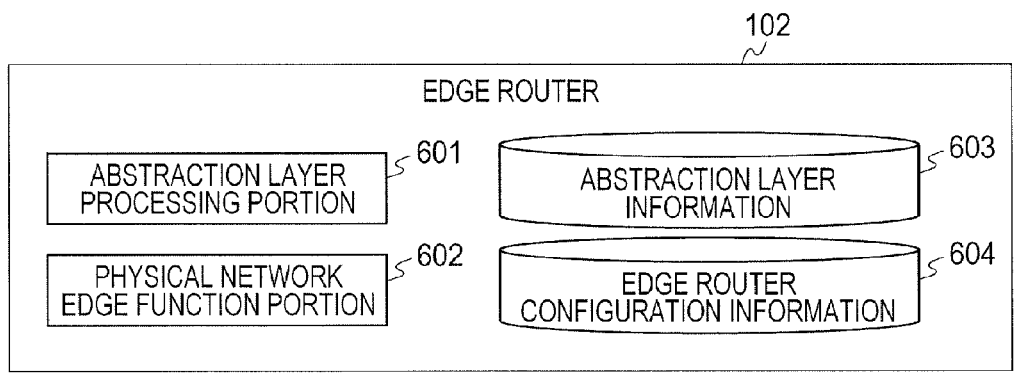
FIG. 15 is a block diagram illustrating a software configuration of an edge router according to the first embodiment of the invention.
FIG. 16 is an explanatory diagram illustrating still another example of abstraction layer information according to the first embodiment of the invention.

FIG. 15 is a block diagram illustrating the software configuration of the edge router 102 according to the first embodiment of the invention.

The edge router 102 includes an abstraction layer processing portion 601 and a physical network edge function portion 602 as function blocks.

The edge router 102 maintains abstraction layer information 603 and edge router configuration information 604 as management information.

The abstraction layer processing portion 601 manages an abstraction network based on the abstraction layer information 603. A request from the virtual network management server 105 activates the abstraction layer processing portion 601.

The physical network edge function portion 602 includes a routing resolving function and an encapsulation function. The routing resolving function correctly routes a communication packet in the physical network 101 when the packet comes from the outside to the physical network 101. The encapsulation function encapsulates a communication packet in the physical network 101.

The encapsulation function encapsulates an incoming communication packet and decapsulates an outgoing communication packet.

The abstraction layer information 603 stores information about the edge router in the abstraction network. The abstraction layer information 603 will be described in detail with reference to FIG. 16.

The edge router configuration information 604 stores configuration information about the physical network 101 needed for the routing resolving function and the encapsulation function provided for the physical network edge function portion 602.

The physical network edge function portion 602 and the edge router configuration information 604 provide functions for the edge routers 102 configuring the physical network 101. Functions to be provided depend on the physical networks 101.

The abstraction layer processing portion 601 and the abstraction layer information 603 are one of the features of the invention and allow the virtual network management server 105 to generate the virtual network 301 across multiple physical networks 101.

FIG. 16 is an explanatory diagram illustrating still another example of the abstraction layer information 603 according to the first embodiment of the invention. The abstraction layer information 603 in FIG. 16 is maintained in the edge router 102 configuring the physical network 1 (1011).

The embodiment represents the abstraction layer information 603 as tabular data T1401.

The abstraction layer information 603 includes an abstract node ID (K1402), a transport function (K1403), an LID (K1404), a network group (K1405), and a physical network connection (K1406).

The abstract node ID (K1402) stores an identifier for identifying the edge router 102 in the abstraction network as the abstract node 702.

The transport function (K1403) stores a protocol type available for the edge router 102.

The LID (K1404) an identifier indicating a place where the edge router 102 is provided in the abstraction network.

The network group (K1405) stores an identifier for identifying the network group 701 containing the edge router 102 in the abstraction network.

The physical network connection (K1406) stores an identifier for identifying the adjacent physical network 101 connected to the edge router 102 as the network group 701.

The following describes the management method for the virtual network 301 in the virtual network system.

An initialization process for the virtual network system will be described first.

Figure 17B:
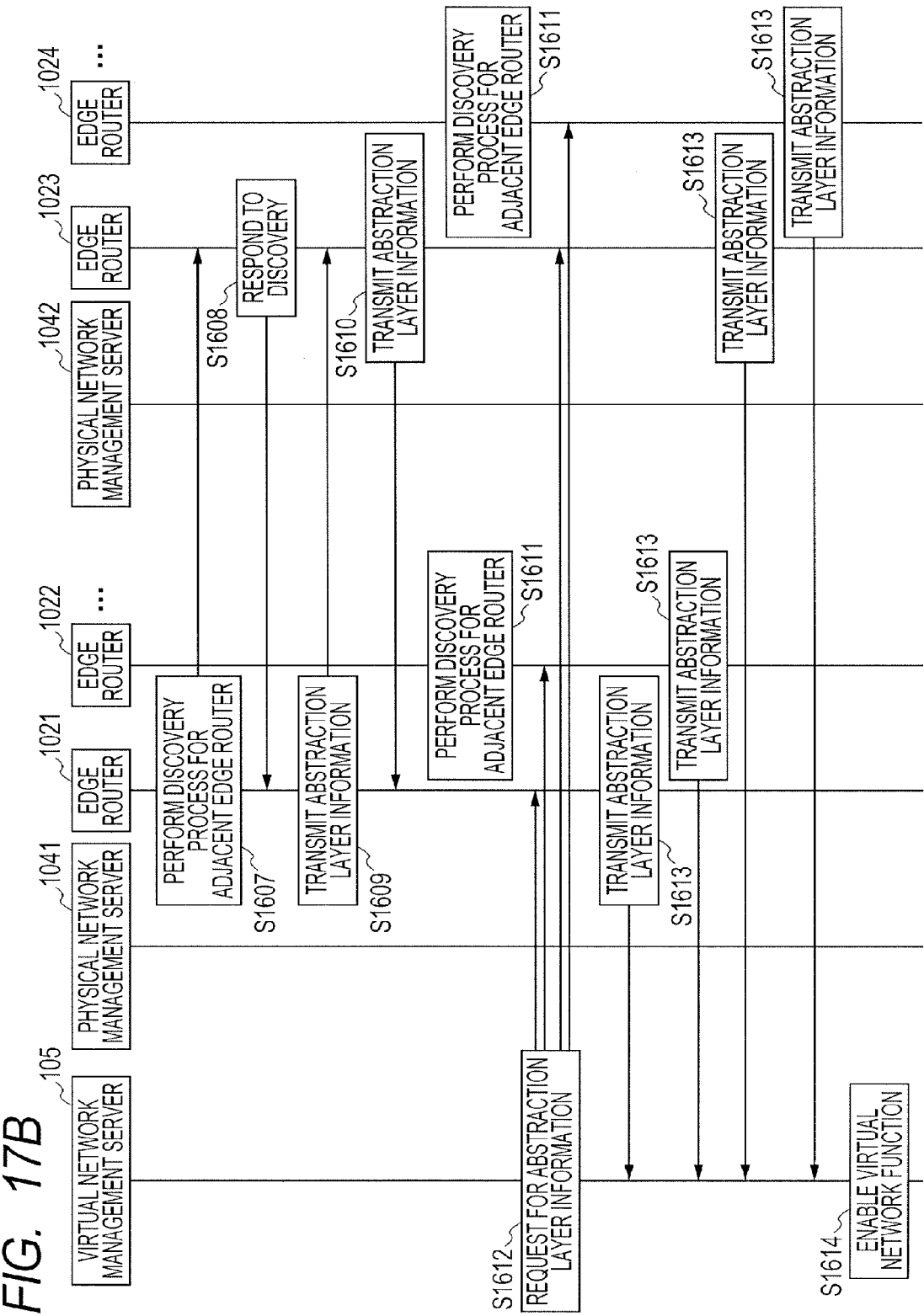
FIG. 17B is a flowchart illustrating an example of an initialization process for the virtual network system according to the first embodiment of the invention.

FIGS. 17A and 17B are flowcharts illustrating an example of the initialization process for the virtual network system according to the first embodiment of the invention.

FIGS. 17A and 17B describe the physical networks 1 (1011) and 2 (1012) for simplicity.

The virtual network management server 105 starts the initialization process for the virtual network system when an operator enters a system initialization request.

The virtual network management server 105 transmits an acquisition request for configuration information about the physical networks 1 (1011) and 2 (1012) to the physical network management servers 1041 and 1042 (step 1601).

The physical network management servers 1041 and 1042 receive the acquisition request from the virtual network management server 105 and transmit the configuration information about the physical networks 1 (1011) and 2 (1012) to the virtual network management server 105 (step 1602). Specifically, the information about the edge router 102 in the physical network 101 is transmitted. For example, the information to be transmitted may include the physical network configuration information 504 and the edge router configuration information 604.

The information to be transmitted to the virtual network management server 105 includes at least the identification information (e.g., location names) indicating provision locations of the edge routers in each physical network 101 and the information about transport functions available for the edge router 102.

The virtual network management server 105 determines the abstraction layer information based on the information about the edge router 102 received from the physical network management servers 1041 and 1042 (step 1603). That is, the abstraction network information is generated.

Specifically, the virtual network management server 105 determines the abstract node ID (K1302), i.e., an identifier of the abstract node 702 for identifying the edge router 102 in the abstraction network. An example method of determining the abstract node ID (K1302) allocates identifiers to the edge routers 102 from the one nearest to the virtual network management server 105. In addition, the abstract node ID (K1302) may be determined otherwise.

The virtual network management server 105 determines the transport function (K1303) available from the edge router 102 based on the information about the edge router 102 received from the physical network management server 104.

The virtual network management server 105 determines the LID (K1304) based on the information about the edge router 102 received from the physical network management server 104. The LID (K1304) is an identifier that indicates the provision location of the edge router 102 in the abstraction network.

The virtual network management server 105 determines the network group (K1305), i.e., an identifier for identifying the physical network 101 containing the edge router 102 in the abstraction network.

The virtual network management server 105 stores the determined abstract node ID (K1302), transport function (K1303), LID (K1304), and network group K1305 in the abstraction layer information 409.

At this time, no information is stored in the physical network connection (K1306).

The virtual network management server 105 then provides each of the physical networks 101 with the determined abstraction layer information (step 1604).

Specifically, virtual network management server 105 transmits the determined abstraction layer information to the physical network management servers 1041 and 1042. The physical network management servers 1041 and 1042 receive the abstraction layer information and store it in the abstraction layer information 503.

The physical network management server 104 stores the physical node ID (K1502) as an identifier of the edge router 102 in the physical network 101 to be managed. The physical network management server 104 stores the received abstraction layer information in association with the physical node ID (K1502). In this manner, the physical network management server 104 can maintain the abstraction layer information 503 as shown in FIG. 14A.

The virtual network management server 105 then transmits a request to activate the abstraction layer processing portion 601 to all edge routers 102 such as 1021, 1022, 1023, and 1024 included in the physical networks 1 (1011) and 2 (1012) (step 1605). As a result, the abstraction layer processing portion 601 provided for the edge router 102 starts a process.

The virtual network management server 105 provides the abstraction layer information determined at step 1603 for all the edge routers 102 included in the physical networks 1 (1011) and 2 (1012) (step 1606). Specifically, the virtual network management server 105 transmits the determined abstraction layer information to each edge router 102.

Each edge router 102 receives the abstraction layer information from the virtual network management server 105 and stores necessary information in the abstraction layer information 603. Specifically, the information is stored in the abstract node ID (K1402), the LID (K1404), and the network group (K1405). The edge router 102 maintains the transport function (K1403) in advance. At this point, no information is stored in the physical network connection (K1406).

The edge router 102 corresponding to the activated abstraction layer processing portion 601 performs a discovery process (steps 1607 and 1611) in order to determine connection to another edge router 102 (adjacent edge router 102) for the adjacent physical network 101.

Specifically, the edge router 102 transmits a discovery signal and determines connection to the adjacent edge router 102 when the signal returns a response.

The edge router 102 terminates the discovery process when the adjacent edge router 102 is not determined to be connected. On the other hand, the edge routers 102 communicate with each other when the adjacent edge router 102 is determined to be connected.

In FIG. 17B, the edge router 1023 receives the discovery signal from the edge router 1021 and transmits a response signal to the edge router 1021 (step 1608).

The edge routers 1021 and 1023 transmit the abstraction layer information 603 maintained in them to each other (steps 1609 and 1610).

In this manner, the edge routers can identify the adjacent network group 701. The edge router 102 receives the abstraction layer information 603 that contains the network group (K1405). The edge router 102 stores identification information about that network group (K1405) in the physical network connection (K1405) contained in the abstraction layer information 603 maintained in the edge router 102.

The virtual network management server 105 verifies the discovery process state through polling, for example, and transmits a request to acquire the abstraction layer information 603 to all the edge routers 102 (step 1612).

The edge routers 102 receive the request to acquire the abstraction layer information 603 and transmit the abstraction layer information 603 to the virtual network management server 105 (step 1613). Specifically, the edge router transmits the information about the physical network connection (K1405) in the abstraction layer information 603.

The information is stored in the physical network connection (K1306) of the abstraction layer information 409.

The virtual network management server 105 enables a function to provide the virtual network 301 and terminates the initialization process for the virtual network system (step 1614).

The above-mentioned process enables the abstraction layer information 409 for the virtual network management server 150, the abstraction layer information 503 for the physical network management server 104, and the abstraction layer information 603 for the edge router 102. That is, the abstraction network information is generated.

According to the embodiment, the abstraction network information is used for mapping between the virtual network 301 and the physical network 101.

The process shown in FIGS. 17A and 17B configures the abstraction layer information 409, the abstraction layer information 509, and the abstraction layer information 603.

The following describes a process performed when the new virtual network 301 is generated in the virtual network system according to the embodiment.

Figure 18:
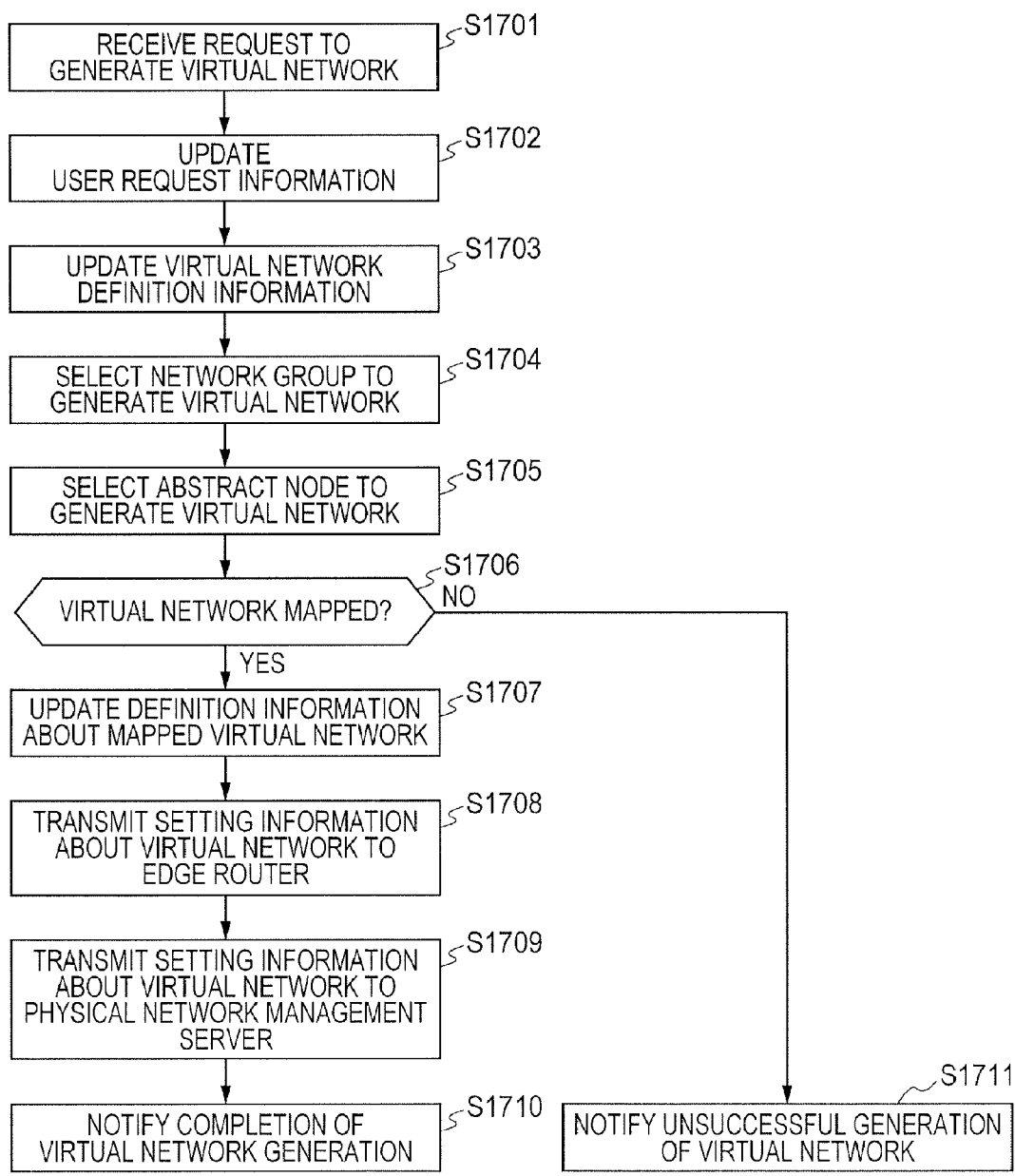
FIG. 18 is a flowchart illustrating an example process to generate the virtual network according to the first embodiment of the invention.

FIG. 18 is a flowchart illustrating an example process to generate the virtual network 301 according to the first embodiment of the invention.

The virtual network management server 105 starts the process when receiving a request to generate the virtual network from an operator of the virtual network system (step 1701).

The virtual network management server 105 updates the user request information 405 based on the received virtual network generation request (step 1702). Specifically, the user request information 405 stores the information contained in the received virtual network generation request.

The virtual network management server 105 further updates the virtual network definition information 406 based on the information stored in the user request information 405 (step 1703).

For example, the virtual network management server 105 acquires the physical network configuration information 504 from each physical network management server 104. The virtual network management server 105 converts the information stored in the user request information 405 into information for configuring the virtual network based on the received physical network configuration information 504 and the user request information 405. The virtual network management server 105 stores the information in the virtual network definition information 406. The virtual network management server 105 may acquire the edge router configuration information 604 as well.

For example, the virtual network management server 105 searches the acquired physical network configuration information 503 for a location name entry corresponding to the user location (K904) of the user request information 405. The virtual network management server 105 converts the transport function (K903) of the user request information 405 into the transport function (K1516). The virtual network management server 105 also converts the user location (K904) into the corresponding LID (K1517).

The virtual network management server 105 references the virtual network definition information 406 and the abstraction layer information 409 to select the network group 701 for generating the requested virtual network 301 (step 1704). That is, the virtual network management server 105 selects the network group 701 the transfer function corresponding to the transport function (K1003) can provide.

Specifically, the virtual network management server 105 references the transport function (K1303), identifies the network group (K1305) containing a transport function entry corresponding to the transport function (K1003), and selects the network group (K1305) as the network group 701 for generating the virtual network 301.

The virtual network management server 105 references the abstraction layer information 409 and selects the abstract node 702 having LIDs corresponding to the user location LID (K1004) and the transfer location LID (K1005) for the requested virtual network 301 (step 1705).

Specifically, the virtual network management server 105 references the LID (K1304) and selects the abstract node 702 for generating the virtual network 301 out of the abstract nodes 702 contained in the selected network group 701.

The virtual network management server 105 operates based on the network group 701 and the abstract node 702 selected at steps 1703 and 1705 and determines whether the requested virtual network 301 can be mapped to the abstraction layer information 409 (step 1706).

When the mapping is determined to be unsuccessful, the virtual network management server 105 notifies the operator of unsuccessful generation of the virtual network 301 (step 1711) and terminates the process.

When the mapping is determined to be successful, the virtual network management server 105 updates the mapping information 408 based on the mapping result (step 1707). Specifically, the virtual network management server 105 stores the mapping result in the mapping information 408.

The virtual network management server 105 transmits the setting information about the virtual network 301 to the abstract node 702 to which the requested virtual network 301 is mapped (step 1708).

The setting information about the virtual network 301 contains at least the virtual network ID, the transport function, and the mapping information.

The virtual network management server 105 transmits the setting information about the virtual network 301 to the physical network management server 104 in the network group 701 to which the requested virtual network is mapped (step 1709).

The above-mentioned process generates the virtual network 301 across multiple physical networks 101 in the virtual network system.

The virtual network management server 105 notifies the operator of completion of the virtual network generation (step 1710) and terminates the process.

At step 1706, the virtual network management server 105 selects one of candidates, if any, for the requested virtual network 301 to be mapped to the abstraction layer information 409. As one method, the operator can directly select one of candidates. As another method, the virtual network management server 105 can automatically select one of candidates based on network costs or the network traffic. The embodiment may use any method.

The following describes a virtual network system changing process performed when a new edge router 1802 is added to the operating virtual network system according to the embodiment.

FIGS. 19A and 19B are flowcharts illustrating an example of a virtual network system changing process performed when the edge router 102 is added to the virtual network system according to the first embodiment of the invention.

FIGS. 19A and 19B describe the physical networks 1 (1011) and 2 (1012) for simplicity.

The following describes a case where an edge router 1801 is added to the physical network 1 (1011).

The physical network management server 1041 transmits a request to acquire information about the edge router 1801 to it when the edge router 1801 is newly added to the physical network 1 (1011) (step 1801).

The edge router 1801 receives the request and transmits the edge router configuration information 604 to the physical network management server 1041 (step 1802).

The physical network management server 1041 transmits the acquired edge router configuration information 604 to the virtual network management server 105 (step 1803).

The virtual network management server 105 determines the abstraction layer information based on the received edge router configuration information 604 (step 1804). Step 1804 may use the same method as step 1603.

The process so far determines the abstract node ID (K1302), the transport function (K1303), the LID (K1304), and the network group (K1305). The abstraction layer information 409 stores the determined abstract node ID (K1302), transport function (K1303), LID (K1304), and network group (K1305).

The virtual network management server 105 provides the determined abstraction layer information for the physical network management server 1041 (step 1805).

Specifically, the virtual network management server 105 transmits the determined abstraction layer information to the physical network management server 1041. The physical network management server 1041 stores the received abstraction layer information in the abstraction layer information 503.

The virtual network management server 105 transmits a request to activate the abstraction layer processing portion 601 to the edge router 1801 (step 1806). The abstraction layer processing portion 601 provided for the edge router 102 starts processing.

The virtual network management server 105 provides the edge router 1801 with the abstraction layer information stored in the abstraction layer information 409 (step 1807).

Specifically, the virtual network management server 105 transmits the abstraction layer information stored in the abstraction layer information 409 to the edge router 1801. The edge router 1801 receives the abstraction layer information from the virtual network management server 105 and stores necessary information in the abstraction layer information 603.

Step 1807 equals step 1606.

The edge router 1801 performs a discovery process (step 1808) in order to determine connection to the edge router 102 for the adjacent physical network 101. Step 1808 equals steps 1609 and 1610.

The edge router 1801 terminates the discovery process when the adjacent edge router 102 is not determined to be connected. On the other hand, the edge routers 1801 and 102 communicate with each other when the adjacent edge router 102 is determined to be connected.

In FIG. 18B, the edge router 1024 receives the discovery signal from the edge router 1801 and transmits a response signal to the edge router 1801 (step 1809). Step 1809 equals step 1608.

The edge routers 1801 and 1024 transmit their abstraction layer information 603 to each other (steps 1810 and 1811). Steps 1810 and 1811 equal steps 1609 and 1610.

The virtual network management server 105 verifies the discovery process state through polling, for example, and transmits a request to acquire the abstraction layer information 603 to the added edge router 1801 (step 1812). Step 1812 equals step 1612.

The edge router 1801 receives the request to acquire the abstraction layer information 603 and transmits the physical network connection (K1405) of the abstraction layer information 603 to the virtual network management server 105 (step 1813). Step 1813 equals step 1613.

The above-mentioned process completes addition of the edge router 1801 to the virtual network system.

The virtual network management server 105 enables a function to provide the virtual network 301 for the virtual network system including the added edge router 1801 and terminates the process (step 1814). Step 1814 equals step 1614.

The following describes a deletion process that deletes a physical router such as the edge router 102 or the core router 201 from the virtual network system according to the embodiment.

Figure 20:
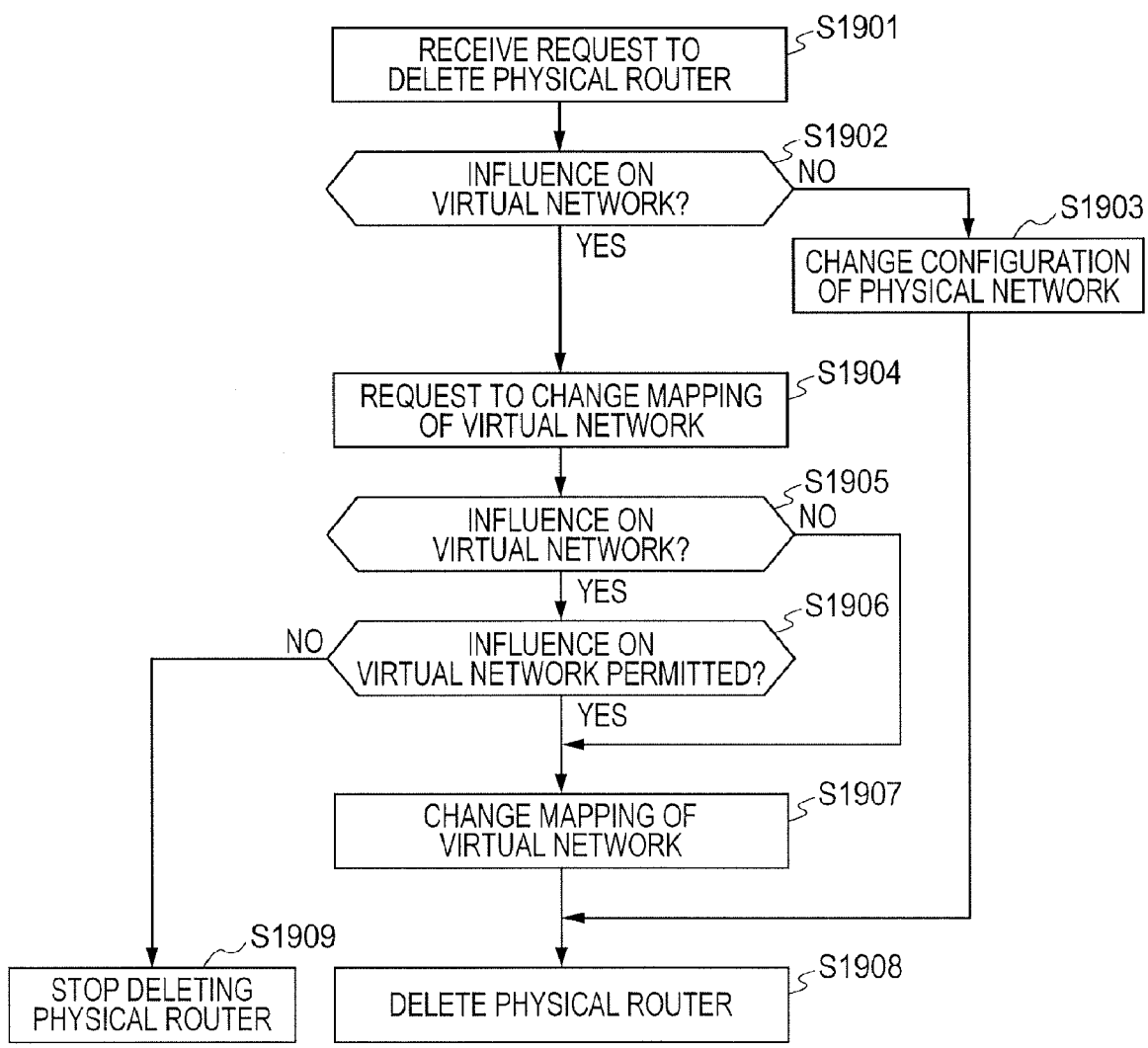
FIG. 20 is a flowchart illustrating a deletion process performed when a physical router is deleted from the virtual network system according to the first embodiment of the invention.

FIG. 20 is a flowchart illustrating a deletion process performed when a physical router is deleted from the virtual network system according to the first embodiment of the invention.

The physical network management server 104 receives a request to delete a physical router from the operator and starts the process (step 1901). The operator uses the virtual network management server 105 to transmit the deletion request to the physical network management server 104 for the physical network 101 to which the physical router to be deleted belongs.

The physical network management server 104 receives the deletion request and determines whether deleting the physical router influences the virtual network 301 (step 1902).

For example, the virtual network 301 is determined to be influenced when the edge router 102 configuring the virtual network 301 is deleted.

The physical network management server 104 changes the configuration of the physical network 101 (step 1903) when deleting the physical router is not determined to influence the virtual network 301. The physical network management server 104 deletes the requested physical router and terminates the process (step 1908).

The physical network management server 104 requests the virtual network management server 105 to change the mapping of the virtual network 301 (step 1904) when deleting the physical network is determined to influence the virtual network 301. Specifically, the physical network management server 104 transmits a mapping change request to the virtual network management server 105.

The virtual network management server 105 receives the mapping change request and remaps the virtual network 301 suspected of being influenced to the abstraction layer information 409.

The virtual network management server 105 determines whether the remapping influences the virtual network 301 to disconnect the network or degrade the performance (step 1905).

When the remapping is determined to influence the virtual network 301, the virtual network management server 105 notifies the influence to the user of the virtual network 301 and determines whether to permit the influence on the virtual network 301 (step 1906).

For example, the influence on the virtual network 301 is determined to be permitted when the virtual network management server 105 receives a notification to permit the influence from the user.

The virtual network management server 105 changes the mapping of the virtual network 301 (step 1907) when no influence is determined to occur on the virtual network 301 at step 1905 or when the influence on the virtual network 301 is permitted at step 1906.

Specifically, the virtual network management server 105 reflects the mapping result at step 1904 on the mapping information 408.

The virtual network management server 105 notifies the physical network management server 104 that the mapping has been changed.

The physical network management server 104 receives the notification indicating the completion of mapping change, deletes the physical router, and terminates the process (step 1908).

The virtual network management server 105 needs to stop deleting the physical router when the determination at step 1906 does not permit the influence on the virtual network 301. The virtual network management server 105 transmits a deletion stop instruction to the physical network management server 104 and terminates the process (step 1909).

The following describes a user location addition process performed when the user location 103 is newly added to the virtual network 301 in the virtual network system according to the embodiment.

Figure 21:
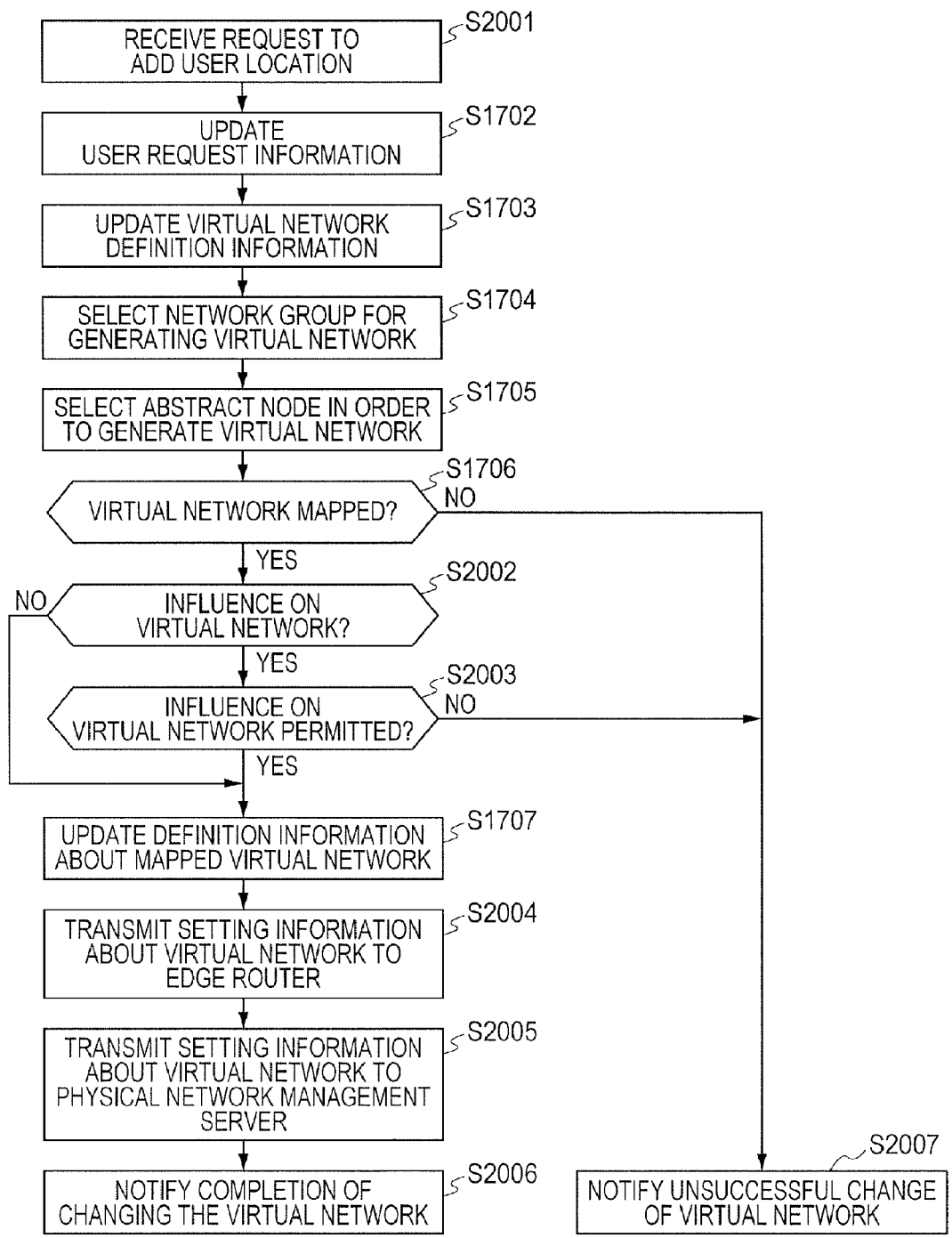
FIG. 21 is a flowchart illustrating an example of a user location addition process performed when a user location is added to a virtual network 301 in the virtual network system according to the first embodiment of the invention.

FIG. 21 is a flowchart illustrating an example of the user location addition process performed when a user location is added to the virtual network 301 in the virtual network system according to the first embodiment of the invention.

The virtual network management server 105 receives a request to newly add the user location 103 to the virtual network 301 from the operator and starts the process (step 2001).

The virtual network management server 105 maps the virtual network 301 provided with the added user location 103 to the abstraction layer information 409 and determines whether the mapping is successful. To do this, the virtual network management server 105 follows the same steps as steps 1702 through 1707 in FIG. 18 and a description is omitted for simplicity. The following mainly describes differences from FIG. 18.

It may be determined at step 1706 that the requested virtual network 301 cannot be mapped to the abstraction layer information 409. In this case, the virtual network management server 105 notifies the operator of an unsuccessful change of the virtual network 301 and terminates the process (step 2007).

It may be determined at step 1706 that the requested virtual network 301 is mapped to the abstraction layer information 409. In this case, the virtual network management server 105 determines whether the mapping change influences the virtual network 301 (step 2002).

When an influence on the virtual network 301 is determined, the virtual network management server 105 notifies the influence to the user of the virtual network 301 and determines whether to permit the influence on the virtual network 301 (step 2003).

When no influence on the virtual network 301 is permitted, the virtual network management server 105 notifies an unsuccessful change of the virtual network 301 to the operator and terminates the process (step 2007).

The virtual network management server 105 updates the mapping information 408 based on the mapping result (step 1707) when no influence on the virtual network 301 is determined at step 2002 or when the influence on the virtual network 301 is permitted at step 2003.

The virtual network management server 105 transmits the setting information about the virtual network 301 to the edge router 102 mapped to the virtual network 301 (step 2004).

The virtual network management server 105 transmits the setting information about the virtual network 301 to the physical network management server 104 that manages the network group 701 mapped to the virtual network (step 2005).

The above-mentioned process can configure the virtual network 301 provided with the added user location 103.

The virtual network management server 105 notifies the operator of completion of changing the virtual network 301 and terminates the process (step 2006).

At step 1706, the virtual network management server 105 selects one of candidates, if any, for the requested virtual network 301 to be mapped to the abstraction layer information 409. As one method, the operator can directly select one of candidates. As another method, the virtual network management server 105 can automatically select one of candidates based on network costs or the network traffic. The embodiment may use any method.

The following describes a configuration of the edge router 102 in the virtual network system according to the first embodiment.

Figure 22:
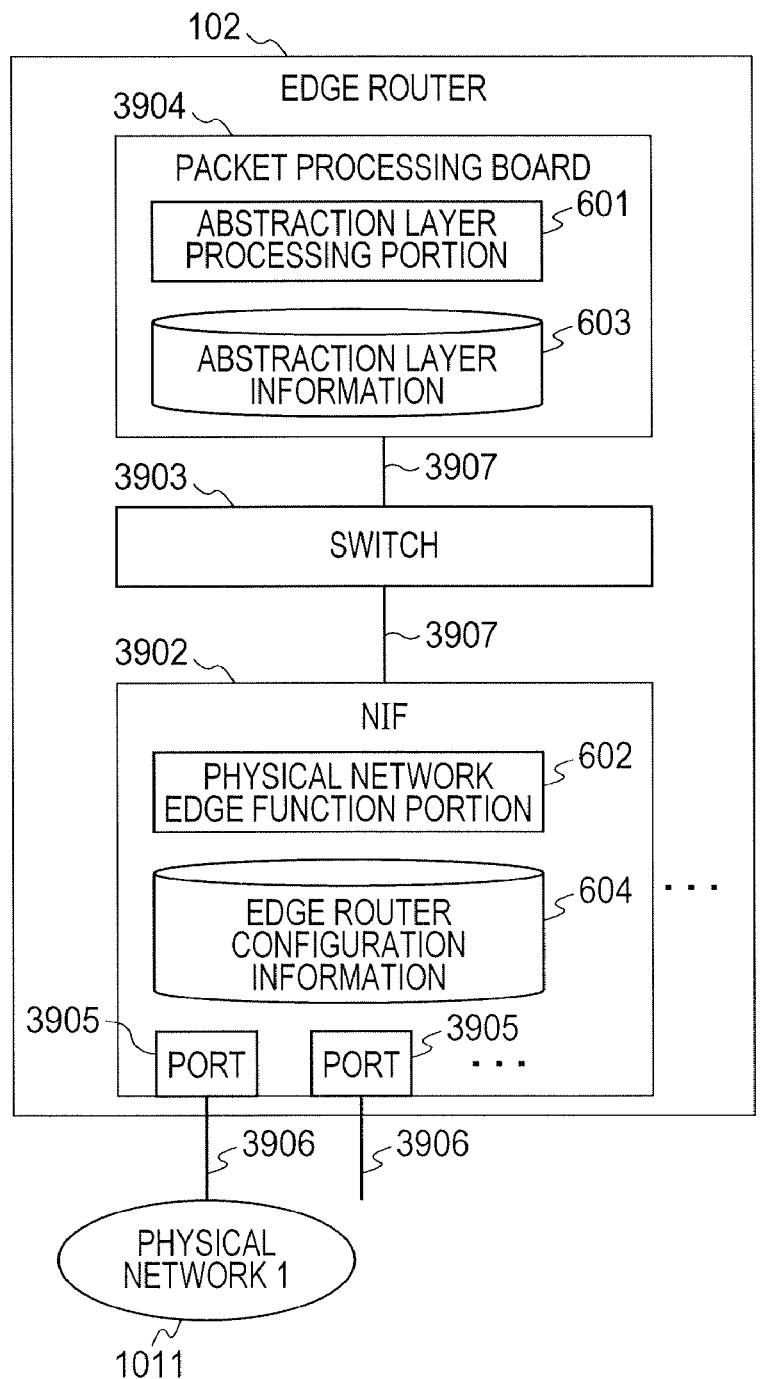
FIG. 22 is a block diagram illustrating an example of installing software for the edge router according to the first embodiment of the invention.

FIG. 22 is a block diagram illustrating an example of installing software for the edge router 102 according to the first embodiment of the invention. The edge router 102 in FIG. 22 belongs to the physical network 1 (1011).

As shown in FIG. 22, the edge router 102 connects with the physical network 1 (1011) through a port 3905.

The network interface 3902 of the edge router 102 includes the physical network edge function portion 602 and the edge router configuration information 604 for the physical network 1 (1011). The packet processing board 3904 of the edge router 102 includes the abstraction layer processing portion 601 and the abstraction layer information 603.

Figure 23:
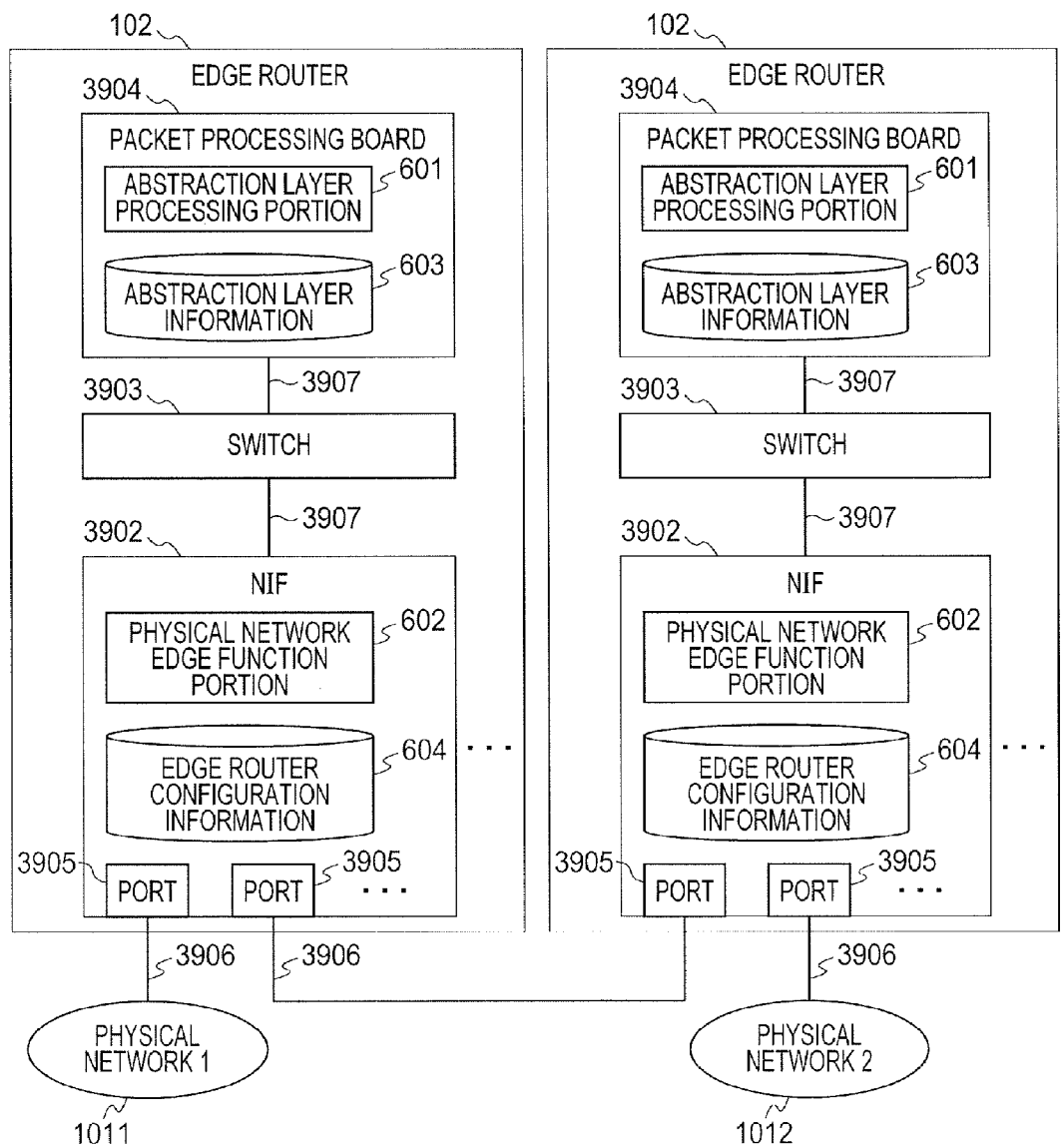
FIG. 23 is a block diagram illustrating an example configuration between two edge routers connecting different physical networks according to the first embodiment of the invention.

FIG. 23 is a block diagram illustrating an example configuration between two edge routers 102 connecting different physical networks 101 according to the first embodiment of the invention.

As shown in FIG. 23, an edge router 1021 is connected to the physical network 1 (1011). An edge router 1022 is connected to the physical network 2 (1012). The edge routers 1021 and 1022 are connected to each other through a communication cable 3906.

The network interface 3902 of the edge router 1022 includes the physical network edge function portion 602 and the edge router configuration information 604 for the physical network 2 (1022).

Figure 24:
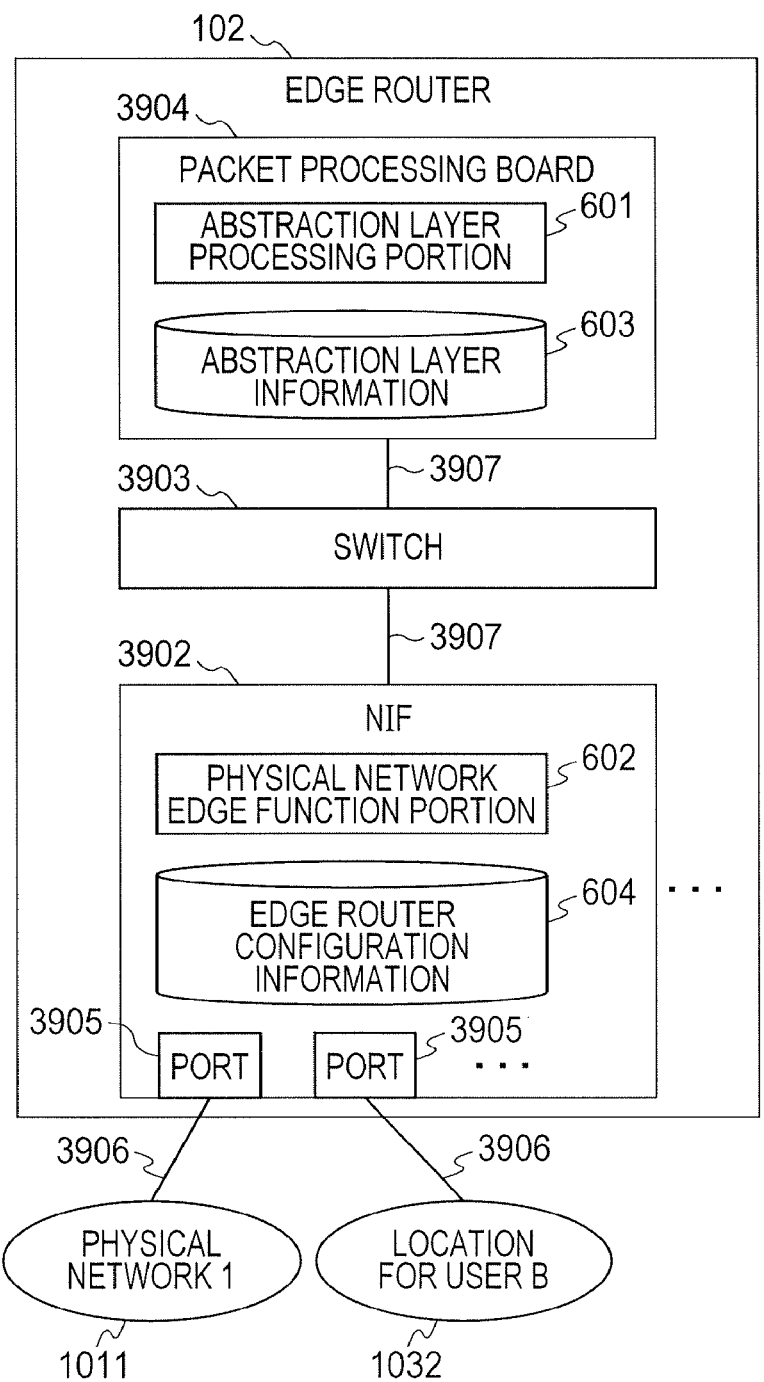
FIG. 24 is a block diagram illustrating an example configuration of an edge router connecting a physical network and a user location according to the first embodiment of the invention.

FIG. 24 is a block diagram illustrating an example configuration of the edge router 102 connecting the physical network 101 and the user location 103 according to the first embodiment of the invention.

As shown in FIG. 24, the network interface 3902 connects with the user location 1032 for user B when the edge router 102 connects with the physical network 1 (1011) and the user location 1032 for user B.

Conventionally, it has been necessary to confirm configurations of the physical networks 101 and map them to each other in order to generate the virtual network 301. Accurate management of information has been necessary when the physical networks 101 manage different information or use different management methods.

The abstraction network according to the first embodiment of the invention can use the common information to indivisibly manage the virtual network system including multiple physical networks 101. It is possible to solve the problem of conventional technologies.

The physical networks 101 are managed as an abstraction network using the common information. It is possible to automatically and instantly generate the virtual network 301 that satisfies operator's needs.

Second Embodiment

The following describes a virtual network system according to the second embodiment of the invention.

The second embodiment provides the abstract node 702 with a function that processes a unique abstraction layer address in the virtual network system. The other configurations equal those of the first embodiment. The following mainly describes differences from the first embodiment.

Figures 25, 26A, 26B:
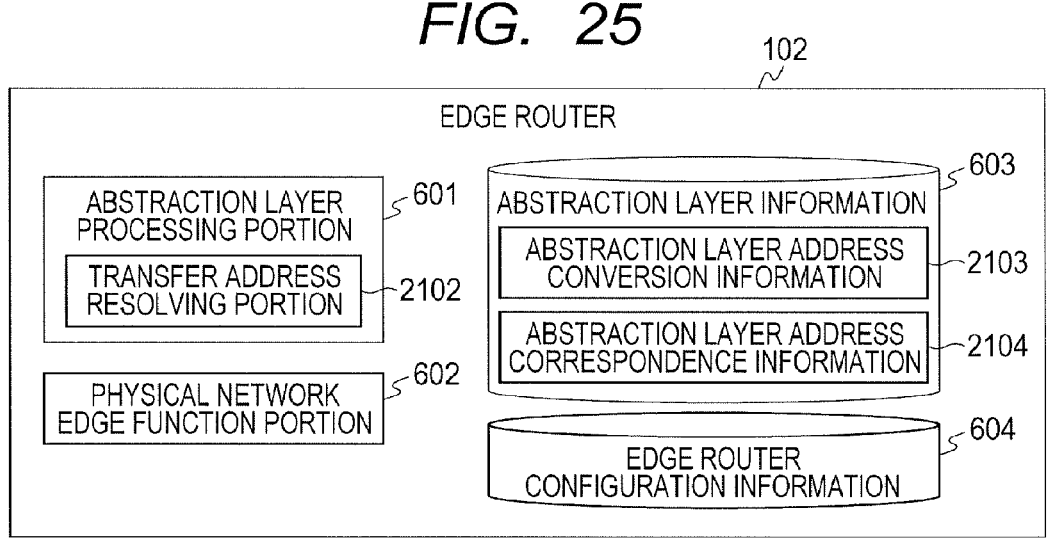
FIG. 25 is a block diagram illustrating a software configuration of an edge router according to a second embodiment of the invention.
FIG. 26A is an explanatory diagram illustrating an example of abstraction layer address conversion information according to the second embodiment of the invention.
FIG. 26B is an explanatory diagram illustrating an example of abstraction layer address correspondence information according to the second embodiment of the invention.

FIG. 25 is a block diagram illustrating a software configuration of the edge router 102 according to the second embodiment of the invention.

The edge router 102 according to the second embodiment includes a transfer address resolving portion 2102 added to the abstraction layer processing portion 601 of the edge router 102 according to the first embodiment. Abstraction layer address conversion information 2103 and abstraction layer address correspondence information 2104 are added to the abstraction layer information 603.

The transfer address resolving portion 2102 supplies or deletes an abstraction address from a communication packet. The transfer address resolving portion 2102 resolves addresses using an abstraction layer address. A process of the transfer address resolving portion 2102 will be described in detail with reference to FIG. 30.

The abstraction layer address conversion information 2103 stores an abstraction layer address that uniquely identifies the abstract node 702 in the virtual network system. The abstraction layer address conversion information 2103 will be described in detail with reference to FIG. 26A.

The abstraction layer address correspondence information 2104 stores correspondence relation between the abstraction address and the user location 103 connected to the edge router 102. The abstraction layer address correspondence information 2104 will be described in detail with reference to FIG. 26B.

FIG. 26A is an explanatory diagram illustrating an example of the abstraction layer address conversion information 2103 according to the second embodiment of the invention.

The embodiment represents the abstraction layer address conversion information 2103 as tabular data T2301.

The abstraction layer address conversion information 2103 contains an abstraction layer address (K2302) and a physical network address (K2303).

The abstraction layer address (K2302) stores an address that uniquely identifies the abstract node 702 included in the network group 701 in the abstraction network.

The physical network address (K2303) stores the address of a node such as the edge router 102 corresponding to the abstract node 702 in the physical network 101.

Information about the abstraction layer address is added to the abstraction layer information 409.

FIG. 26B is an explanatory diagram illustrating an example of the abstraction layer address correspondence information 2104 according to the second embodiment of the invention.

The embodiment represents the abstraction layer address correspondence information 2104 as tabular data T2401.

The abstraction layer address correspondence information 2104 contains an MAC address (K2402) and an abstraction layer address (K2403).

The MAC address (K2402) stores an MAC address for identifying the user location 103 connected to edge router 102.

The abstraction layer address (K2403) equals the abstraction layer address (K1302).

According to the embodiment, the edge router 102 references the abstraction layer address correspondence information 2104 to provide the communication packet with an abstraction address.

There may be two methods of providing the abstraction layer address correspondence information 2104. As the first method, the edge router 102 learns communication packets and generates the abstraction layer address correspondence information 2104. As the second method, the operator uses predetermined information as the abstraction layer address correspondence information 2104. The following description is based on the second method.

While the embodiment uses the MAC address, the present invention is not limited thereto. The MAC address may be replaced by information corresponding to ports, VLAN, or higher-order layers, for example.

The edge router 102 may maintain the abstraction layer address conversion information 2103 and the abstraction layer address correspondence information 2104 as one piece of management information.

FIG. 27 is an explanatory diagram illustrating an example of the abstraction layer information 409 according to the second embodiment of the invention.

The embodiment represents the abstraction layer information 409 as tabular data T2201.

The abstraction layer information 409 contains the abstract node ID (K1302), the transport function (K1303), the LID (K1304), the network group (K1305), the physical network connection (K1306), and an abstraction layer address (K2202). As shown in FIG. 27, the second embodiment differs from the first embodiment in the abstraction layer address (K2202), a new column added to store an abstraction layer address.

The following describes a virtual network system initialization process according to the second embodiment.

Figure 28:
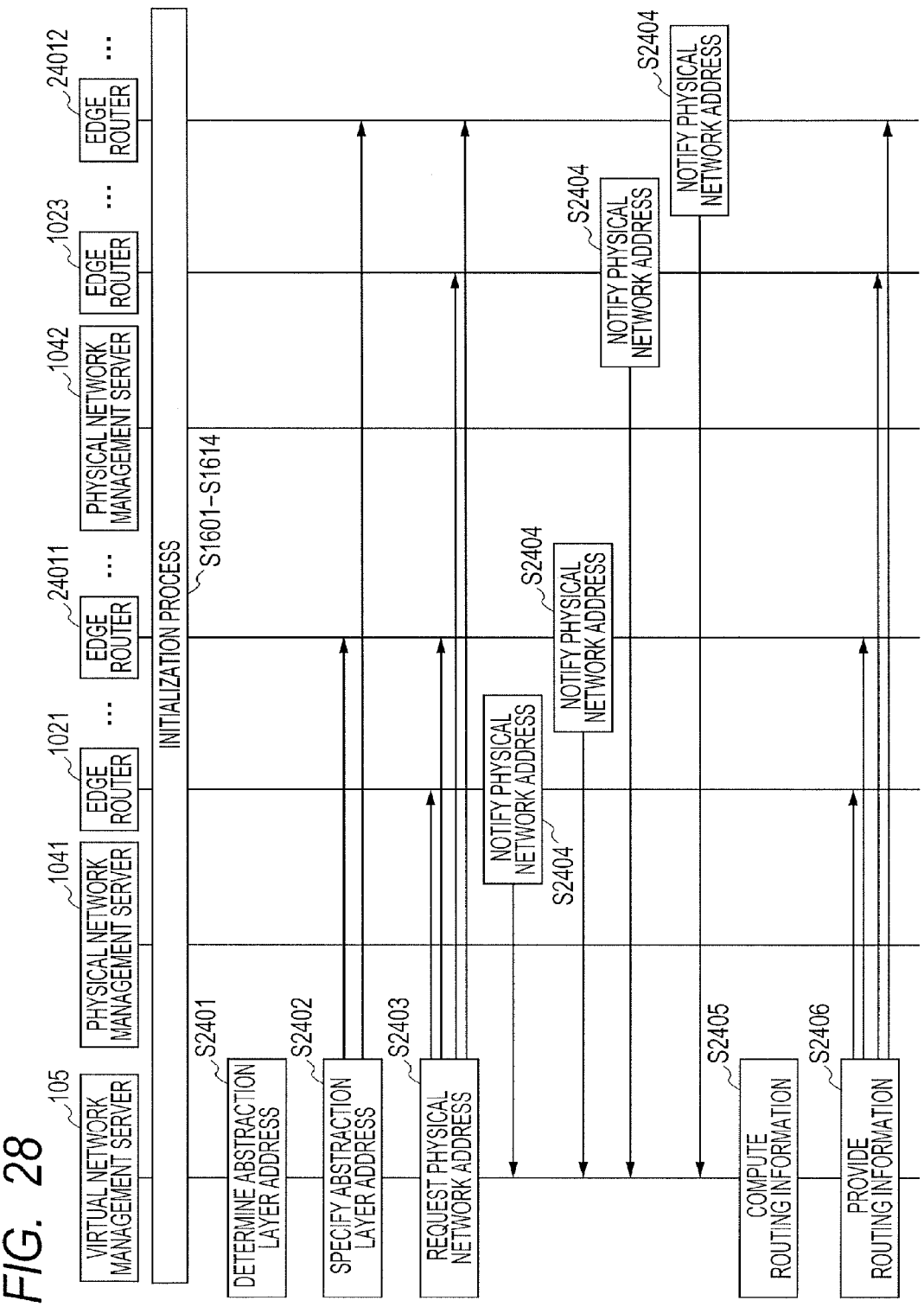
FIG. 28 is a flowchart illustrating an example of a virtual network system initialization process according to the second embodiment of the invention.

FIG. 28 is a flowchart illustrating an example of the virtual network system initialization process according to the second embodiment of the invention.

The initialization process (steps 1601 through 1614) in FIG. 17 is first performed. Then, the following process is performed.

The virtual network management server 105 determines the abstraction layer address of each abstract node 702 based on the information predetermined by the operator. The virtual network management server 105 stores the determined abstraction layer address in the abstraction layer address (K2202) of the abstraction layer information 409 (step 2401).

The virtual network management server 105 specifies the determined abstraction layer address for edge routers 24011 and 24012 connected to the user location 103 (step 2402).

Specifically, the determined abstraction layer address is transmitted to the edge routers 24011 and 24012. The edge routers 24011 and 24012 store the received abstraction address in an abstraction address (K2302) of the abstraction layer address conversion information 2103 and an abstraction address (K2402) of the abstraction layer address correspondence information 2104.

The virtual network management server 105 transmits a request to the edge routers 1021, 1023, 24011, and 24012 so as to acquire the address information about these edge routers (step 2403) in the physical network 101.

The edge routers 1021, 1023, 24011, and 24012 receive the address information acquisition request and transmit the address information in the physical network 101 to the virtual network management server 105 (step 2404).

The virtual network management server 105 computes routing information in the abstraction network based on the abstraction layer address and the addresses in the physical network 101 (step 2405).

The virtual network management server 105 transmits the computed routing information to the edge routers 1021, 1023, 24011, and 24012 (step 2406).

The edge routers 1021, 1023, 24011, and 24012 store the received routing information in the abstraction layer address conversion information 2103 and the abstraction layer address correspondence information 2104.

The above-mentioned process completes the configuration of the abstraction layer address conversion information 2103 and the abstraction layer address correspondence information 2104 for the edge routers 1021, 1023, 24011, and 24012. This makes it possible to verify the correspondence relation between the abstraction layer address and the address in the physical network 101.

The following describes a process performed by the transfer address resolving portion 2102 of an edge router 2101 according to the second embodiment.

Figure 29:
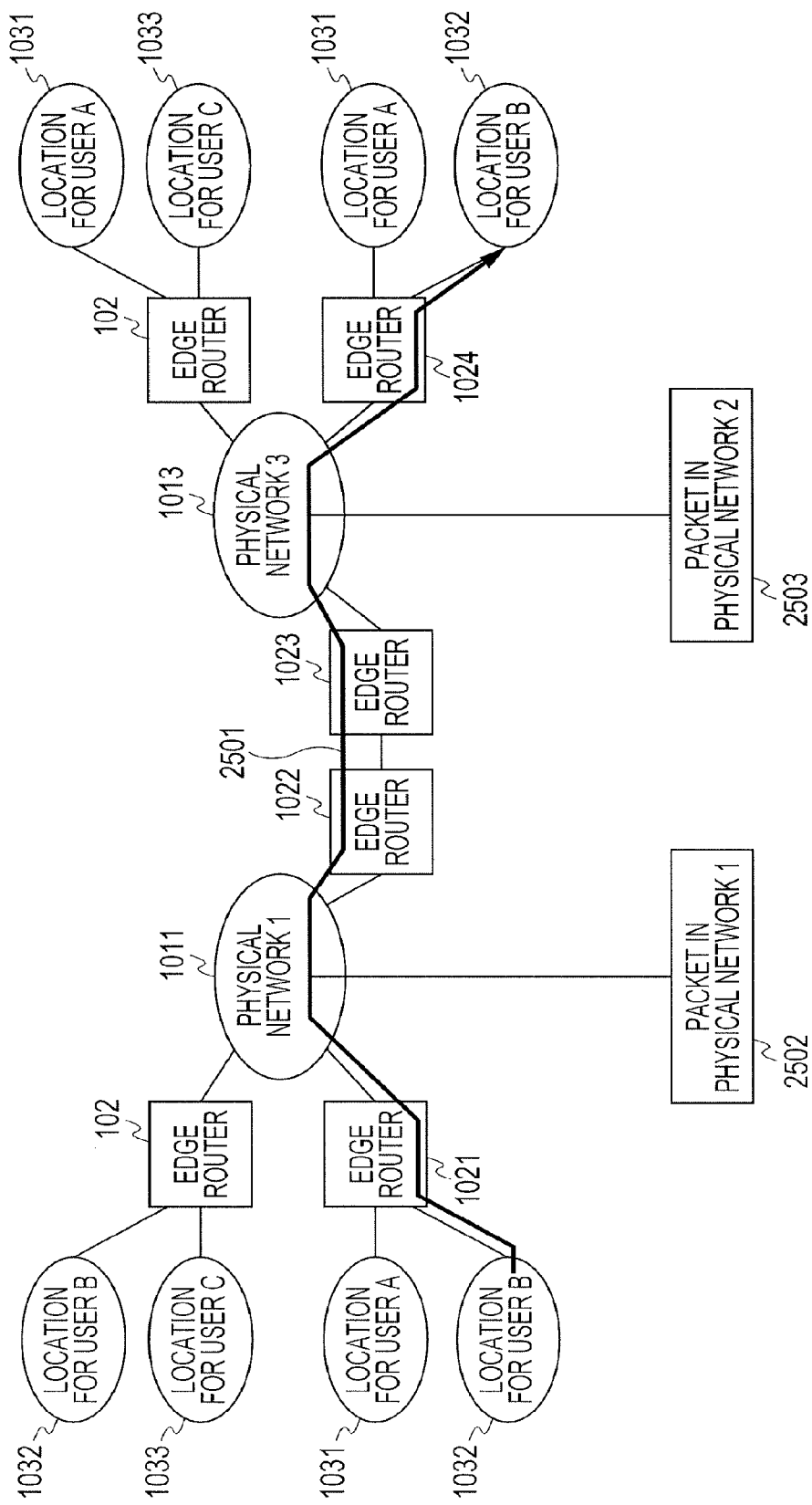
FIG. 29 is a flowchart illustrating an example of a communication path for communication packets between locations for user B in the virtual network system according to the second embodiment of the invention.

FIG. 29 is a flowchart illustrating an example of a communication path for communication packets between locations 1032 for user B in the virtual network system according to the second embodiment of the invention.

The virtual network 301 includes the physical network 1 (1011) and the physical network 3 (1013) and connects the locations 1032 for user B to each other. A communication packet for user B is transferred between the locations 1032 for user B over a communication path 2501 in FIG. 29, for example.

The physical network 101 uses different methods to configure virtual networks. In the physical network 1 (1011), for example, the physical network edge function portion 602 of the edge routers 1021 and 1022 changes a communication packet into a communication packet 2502 transferable in the physical network 1 (1011) based on the abstraction layer address conversion information 2103 and the abstraction layer address correspondence information 2104.

In the 3 (1013), the physical network edge function portion 602 of the edge routers 1023 and 1024 changes a communication changes a communication packet into a communication packet 2503 transferable in the physical network 3 (1013) based on the abstraction layer address conversion information 2103 and the abstraction layer address correspondence information 2104.

The embodiment supplies header information unchanged in the virtual network to communication packets exchanged in the virtual network system. The following describes communication packet structures according to the embodiment.

Figure 30:
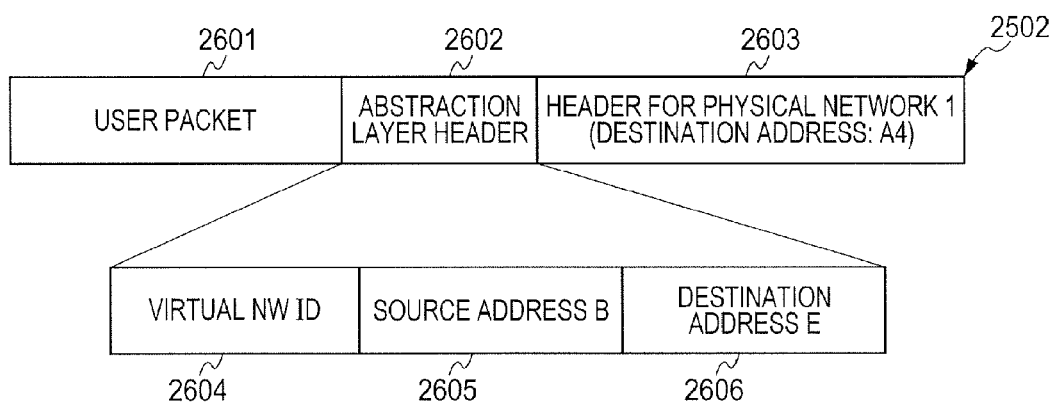
FIG. 30 is an explanatory diagram illustrating an example of a communication packet structure for the physical network according to the second embodiment of the invention.
Figure 31:
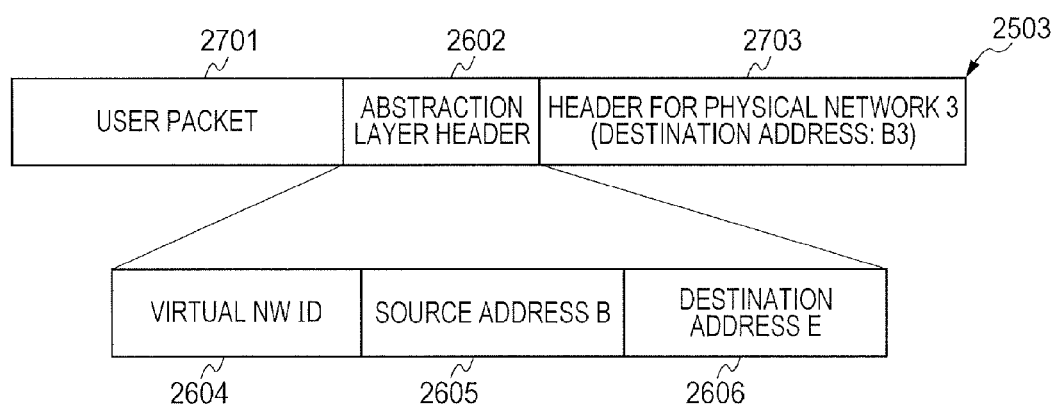
FIG. 31 is an explanatory diagram illustrating another example of a communication packet structure for the physical network according to the second embodiment of the invention.

FIG. 30 is an explanatory diagram illustrating an example structure of the communication packet 2502 for the physical network 1 (1011) according to the second embodiment of the invention. FIG. 31 is an explanatory diagram illustrating an example structure of the communication packet 2503 for the physical network 3 (1013) according to the second embodiment of the invention.

The communication packet 2502 contains a user packet 2601, an abstraction layer header 2602, and a header 2603 for the physical network 1.

The user packet 2601 indicates a communication packet for the user within the user location 103.

The abstraction layer header 2602 indicates header information unchanged in the virtual network 301. For example, the abstraction layer header 2602 contains: an abstraction layer address E (destination address) 2606 for the edge router 1024 connected to the location 1032 for user B as a destination in the virtual network 301; an abstraction layer address B (source address) 2605 for the edge router 1021 connected to the location 1032 for user B as a transmission origin; and a virtual network identifier 2604 as other control information.

The header 2603 for the physical network 1 provides header information in the physical network 1 (1011). For example, the header to the physical network 1 contains address A4 in the physical network 1 (1011) as a destination address.

The communication packet 2503 contains a user packet 2701, an abstraction layer header 2602, and a header 2703 for the physical network 3.

The abstraction layer header 2602 contains: an abstraction layer address E (destination address) 2606 for the edge router 1024 connected to the location 1032 for user B as a destination in the virtual network 301; an abstraction layer address B (source address) 2605 for the edge router 1021 connected to the location 1032 for user B as a transmission origin; and a virtual network identifier 2604 as other control information.

As shown in FIG. 31, the abstraction layer header 2602 remains unchanged in any physical network 101.

The header 2703 for the physical network 3 contains address B3 in the physical network 3 (1013) as a destination address.

The edge routers 1021, 1022, 1023, and 1024 according to the embodiment use the abstraction layer addresses and the addresses in the physical network 101 as described below.

The edge router 1021 maintains address A2 in the physical network 1 and abstraction layer address B.

The edge router 1022 maintains address A4 in the physical network 1 but no abstraction layer address.

The edge router 1023 maintains address D3 in the physical network 3 but no abstraction layer address.

The edge router 1024 maintains address B2 in the physical network 3 and abstraction layer address D.

The transfer address resolving portion 2102 of the edge router 1023 references the abstraction layer address conversion information 2103 based on the abstraction layer header 2602 in the communication packet and resolves the routing in the physical network 3 (1013) for the communication packet.

For example, let us assume that the communication packet contains a destination address 2606 set to "E" in the abstraction layer header 2602. The transfer address resolving portion 2102 of the edge router 1023 identifies the address of the physical network 3 (1013) as "B3" from the row containing the abstraction layer address K1302 set to "E" in the abstraction layer address conversion information 2103. The edge router performs a routing process on the assumption that the communication packet 2503 corresponds to the destination address B3 for the header 2703 in the physical network 3 (1013).

The edge router 102 supplies an abstraction address as follows, for example.

The edge router 102 first analyzes a received communication packet. Based on the analysis result, the edge router then references the abstraction layer address conversion information 2103 and the abstraction layer address correspondence information 2104 and supplies the received communication packet with an abstraction layer header containing the abstraction address.

The edge router 102 deletes the abstraction layer header from the communication packet when transmitting the communication packet to each location 103.

Conventionally, each of edge routers 102 needs to maintain addresses in the user space and addresses in the physical network 101 to which the edge router belongs. The edge router 102 may need to maintain too large a table for address resolution. The number of entries equals the product of the number of edge routers multiplied by that of user addresses and users.

However, the second embodiment of the invention uses the unique abstraction layer address throughout the virtual network system including multiple physical networks and adds an abstraction header for the abstraction layer address to a communication packet. The virtual network system can resolve an address using the abstraction layer address. The virtual network system can decrease the amount of information about addresses to be converted. It is possible to reduce costs for the router apparatus and the operation and maintenance control.

Third Embodiment

The following describes a virtual network system according to the third embodiment of the invention.

The virtual network system according to the third embodiment differs from the virtual network system according to the first embodiment in that the physical network 101 includes an additional router provided with the virtual function such as a virtual computer (server) or a virtual switch. The other configurations equal those of the first embodiment. The following mainly describes differences from the first embodiment.

As shown in FIGS. 3A through 3C, the virtual networks 3011, 3012, and 3013 are logically separated for each of users and independently connect the user locations 1031, 1032, and 1033 for the corresponding users.

For example, the virtual network 3011 for user A is configured as follows. A virtual network for user A is configured in each of the physical networks 1 (1011), 2 (1012), and 3 (1013). The edge routers 102 connect the user-A virtual networks configured in the physical networks (1011), 2 (1012), and 3 (1013) to configure a virtual network across the physical networks 1011, 1012, and 1013. The edge routers 102 connect the configured virtual network for user A with the location 1031 for user A to configure the virtual network 3011 for user A as shown in FIG. 3.

The embodiment assumes that the independent virtual networks 301 are allocated to users. Instead, the virtual network 301 may be allocated to each service supplied from a carrier or service provider or to each application owned by a user.

Figure 32:
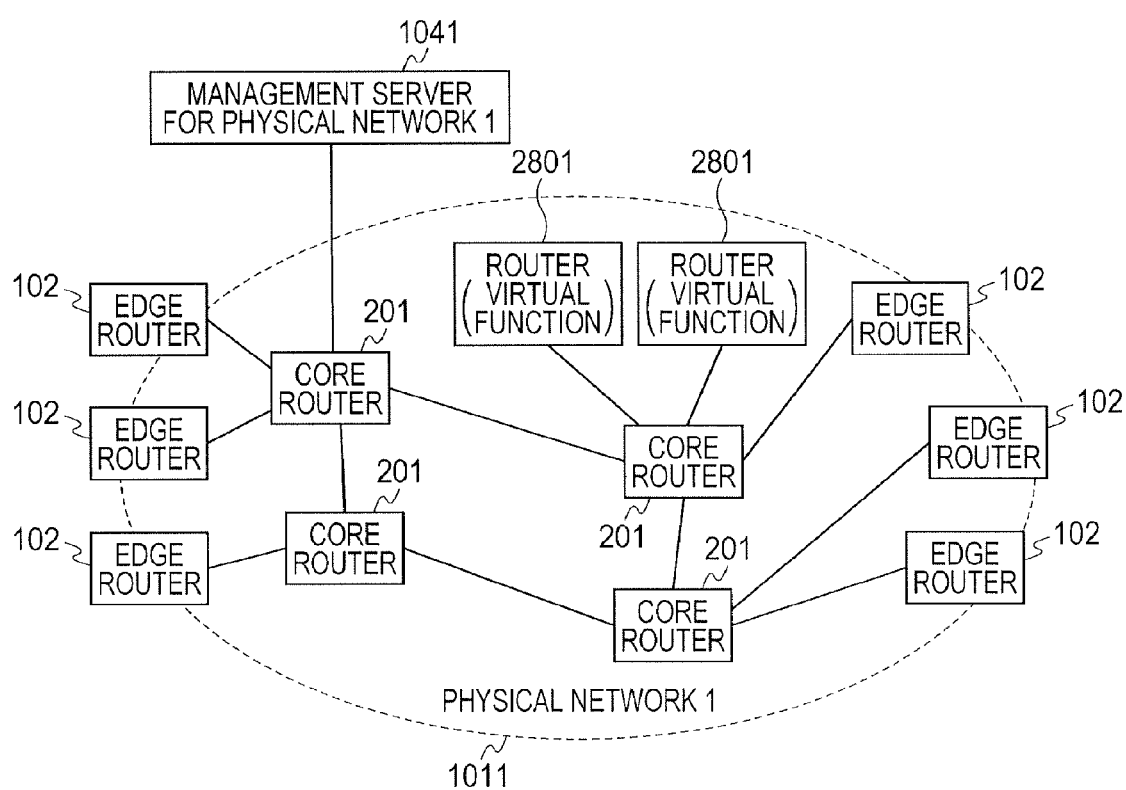
FIG. 32 is a block diagram illustrating a configuration of a physical network according to a third embodiment of the invention.

FIG. 32 is a block diagram illustrating a configuration of the physical network 101 according to the third embodiment of the invention.

As shown in FIG. 32, the physical network 1 (1011) according to the third embodiment includes a router 2801 provided with the virtual function such as a virtual computer or a virtual switch.

Figure 33A:
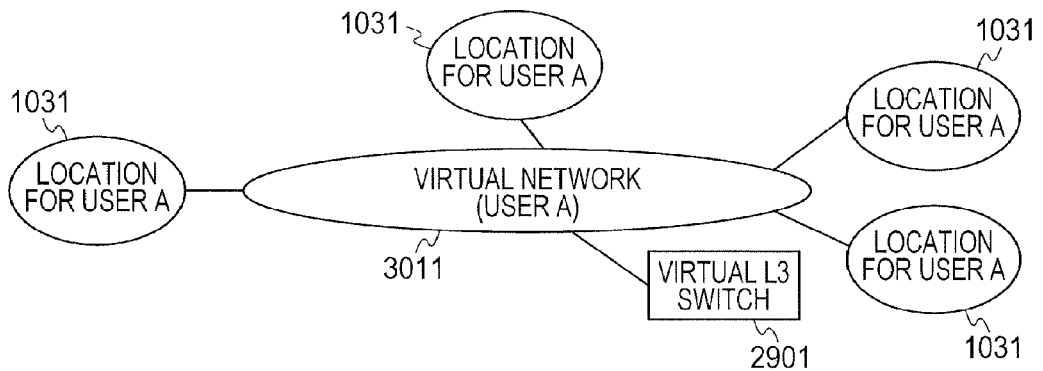
FIG. 33A is a block diagram illustrating an example configuration of the virtual network for each user in the virtual network system according to the third embodiment of the invention.
Figure 33B:
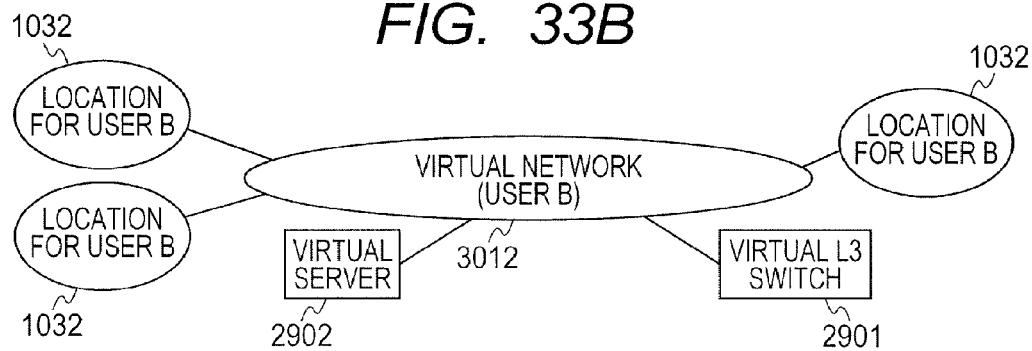
FIG. 33B is a block diagram illustrating another example configuration of the virtual network for each user in the virtual network system according to the third embodiment of the invention.
Figure 33C:
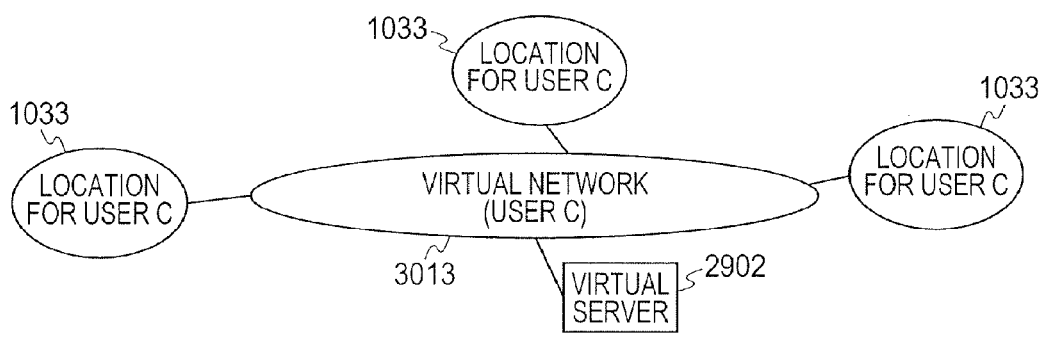
FIG. 33C is a block diagram illustrating still another example configuration of the virtual network for each user in the virtual network system according to the third embodiment of the invention.

FIGS. 33A, 33B, and 33C are block diagrams illustrating example configurations of the virtual network 301 for each user in the virtual network system according to the third embodiment of the invention.

Similarly to FIGS. 3A through 3C, the virtual networks 3011, 3012, and 3013 are logically separated for each of users and independently connect the user locations 1031, 1032, and 1033 for the corresponding users.

According to the embodiment, the virtual function provided for the router 2801 allows a virtual L3 switch 2901 and a virtual server 2902 to be connected to the virtual networks 3011, 3012, and 3013 for corresponding users.

In the example of FIG. 33B, the virtual network 3012 for user B can use functions of the virtual L3 switch 2901 and the virtual server 2902.

In the example, the router 2801 is added to the physical network 1 (1011) for simplicity. The other physical networks 1012 and 1013 may include the router 2801.

The following describes the software configuration of apparatuses included in the virtual network system according to the third embodiment of the invention.

Figure 34:
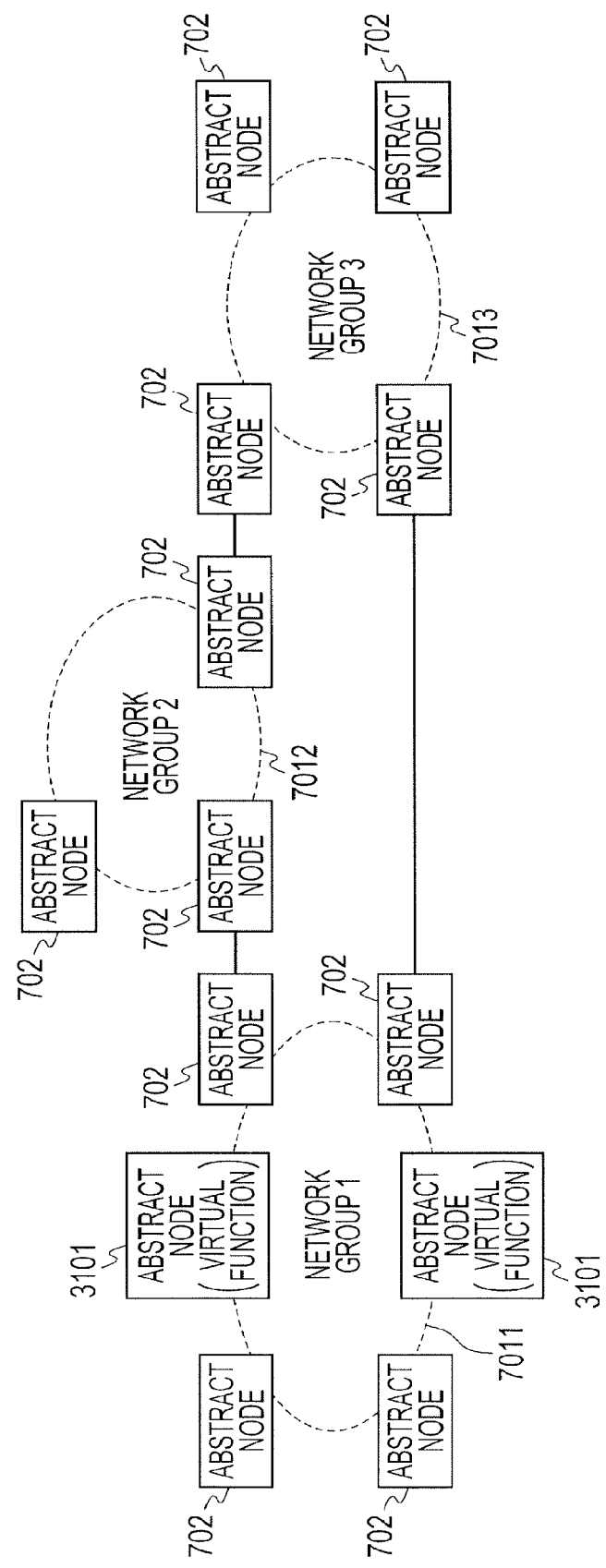
FIG. 34 is an explanatory diagram illustrating an abstraction network generated from abstracting the virtual network system according to the third embodiment of the invention.

FIG. 34 is an explanatory diagram illustrating an abstraction network generated from abstracting the virtual network system according to the third embodiment of the invention.

The abstraction layer managing portion 404 of the virtual network management server 105 uses the abstraction layer information 409 to manage the virtual network system including the physical network 101 shown in FIG. 32 as an abstraction network shown in FIG. 34.

The abstraction network according to the embodiment manages the router 2801 as an abstract node 3101 similarly to the edge router 102.

The following describes information provided for the virtual network management server 105.

The virtual network management server 105 according to the third embodiment uses the same hardware configuration as the virtual network management server 105 according to the first embodiment. A difference is that the virtual network management server 105 according to the third embodiment maintains the virtual function supplied from the router 2801.

FIG. 35 is an explanatory diagram illustrating an example of the abstraction layer information 409 according to the third embodiment of the invention.

The embodiment represents the abstraction layer information 409 as tabular data T3501.

A new column of virtual function (K3502) is added to the abstraction layer information 409 (see FIG. 12) according to the first embodiment.

The virtual function (3502) stores information about the virtual function supplied from the router 2801 corresponding to the abstract node 3101.

As a feature of the invention, the abstraction network can use the common information to manage all the abstract nodes 702 and 3101 configuring the virtual network system as shown in FIG. 35.

FIG. 36 is an explanatory diagram illustrating an example of the user request information 405 according to the third embodiment of the invention.

The embodiment represents the user request information 405 as tabular data T3201.

The user request information 405 stores information about the requested virtual function in addition to a request from the operator for the virtual network 301.

A new column of virtual function (K3202) is added to the user request information 405 (see FIG. 8) according to the first embodiment.

The virtual function (K3202) stores information about an operator-requested virtual function. That is, the virtual function (K3202) indicates the virtual function connected to the virtual network 301 requested by the operator.

FIG. 37 is an explanatory diagram illustrating an example of the virtual network definition information 406 according to the third embodiment of the invention.

The embodiment represents the virtual network definition information 406 as tabular data T3301.

The user request accepting portion 401 converts information stored in the user request information 405 into information about the abstraction network. The virtual network definition information 406 stores that converted information.

A new column of virtual function (K3302) is added to the virtual network definition information 406 (see FIG. 9) according to the first embodiment.

The virtual function (K3302) stores information about an operator-requested virtual function in the abstraction network. That is, the virtual function (K3302) indicates the virtual function connected to the virtual network 301 requested by the operator.

FIG. 38 is an explanatory diagram illustrating the mapping information 408 according to the third embodiment of the invention. FIG. 38 shows the mapping information 408 about the virtual network 3012 allocated to user B.

The embodiment represents the mapping information 408 as tabular data T3401.

The virtual network allocation managing portion 402 maps the virtual network 301 allocated to the user to an abstraction network and stores the mapping result in the mapping information 408.

The mapping information 408 according to the third embodiment contains a new column of virtual function mapping information (K3402) added to the mapping information 408 (see FIG. 11) according to the first embodiment.

The virtual function mapping information (K3402) stores information about the virtual function supplied from the abstract node 3101 allocated to the virtual network 301.

The virtual function mapping information (K3402) contains virtual function (K3403) and abstract node ID (K3404).

The virtual function (K3403) stores information about the virtual function requested by the operator in the abstraction network. That is, the virtual function (K3403) indicates the virtual function connected to the virtual network 301 requested by the operator.

The abstract node ID (K3404) stores an identifier to identify the abstract node 3101 that supplies the virtual function corresponding to the virtual function (K3403).

The example in FIG. 38 shows that the virtual L3 switch function is supplied from the abstract node 3101 having the abstract node ID (K3404) set to "101." The example also shows that the virtual server function is supplied from the abstract node 3101 having the abstract node ID (K3404) set to "102."

The physical network management server 104 is described below.

The physical network management server 104 according to the third embodiment stores information about the virtual function supplied from the router 2801 in the abstraction layer information 503.

FIG. 39 is an explanatory diagram illustrating an example of the abstraction layer information 503 according to the third embodiment of the invention.

The embodiment represents the abstraction layer information 503 as tabular data T3701.

The abstraction layer information 503 according to the third embodiment contains a new virtual function (K3702) added to the abstraction layer information 503 (see FIG. 14A) according to the first embodiment.

The virtual function (K3702) stores information about the virtual function supplied from the router 2801 in the abstraction network. That is, the virtual function (K3702) indicates the virtual function connected to the virtual network 301.

The example in FIG. 39 shows that the router 2801 with the physical node ID (K1502) set to "router e" uses the abstract node ID (K1503) set to "101" and the virtual function (K3502) set to "virtual L3 switch." The example also shows that the router 2801 with the physical node ID (K1502) set to "router f" uses the abstract node ID (K1503) set to "102" and the virtual function (K3502) set to "virtual server."

The router 2801 is described below.

The router 2801 has the same hardware configuration as the edge router 102 and a description is omitted.

Figures 40, 41:
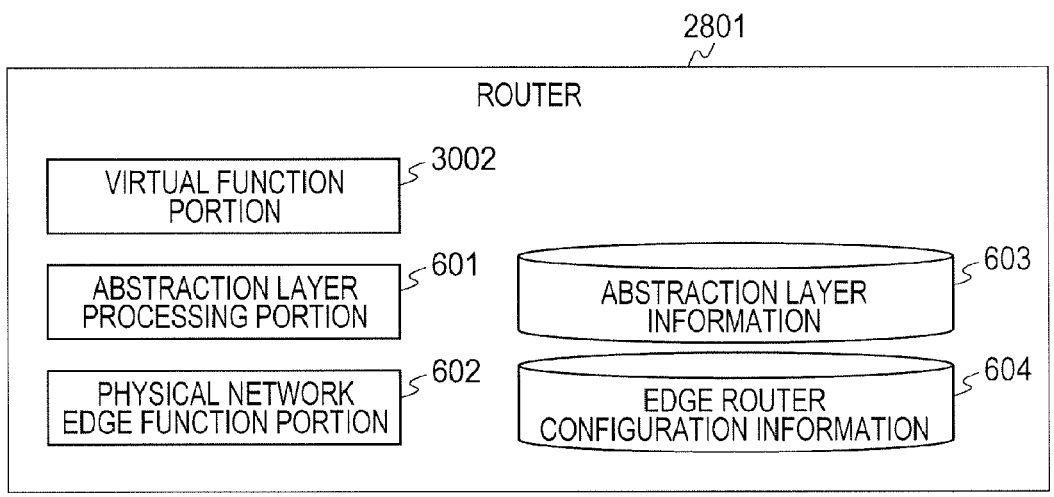
FIG. 40 is a block diagram illustrating a software configuration of a router according to the third embodiment of the invention.
FIG. 41 is an explanatory diagram illustrating an example of abstraction layer information provided for a router according to the third embodiment of the invention.

FIG. 40 is a block diagram illustrating a software configuration of the router 2801 according to the third embodiment of the invention.

The router 2801 differs from the edge router 102 in that a virtual function portion 3002 is provided.

The virtual function portion 3002 has a function that supplies the virtual network 301 with the virtual function such as the virtual switch or the virtual server. The abstraction layer information 603 of the router 2801 contains information different from the abstraction layer information 603 of the edge router 102.

FIG. 41 is an explanatory diagram illustrating an example of the abstraction layer information 603 provided for the router 2801 according to the third embodiment of the invention.

The embodiment represents the abstraction layer information 603 provided for the router 2801 as tabular data T3601.

The abstraction layer information 603 according to the third embodiment contains a new column of virtual function (K3602) added to the abstraction layer information 603 (see FIG. 16) according to the first embodiment.

The virtual function (K3602) stores information about the virtual function supplied from the router 2801 in the abstraction network. That is, the virtual function (K3602) indicates the virtual function connected to the virtual network 301.

According to the embodiment, the virtual function portion 3002 is provided for the edge router 102 but may be provided for the other apparatuses. For example, a server apparatus included in the physical network 101 may be provided with the virtual function portion 3002.

The following describes a process of generating the virtual network 301 in the virtual network system according to the third embodiment.

Figure 42:
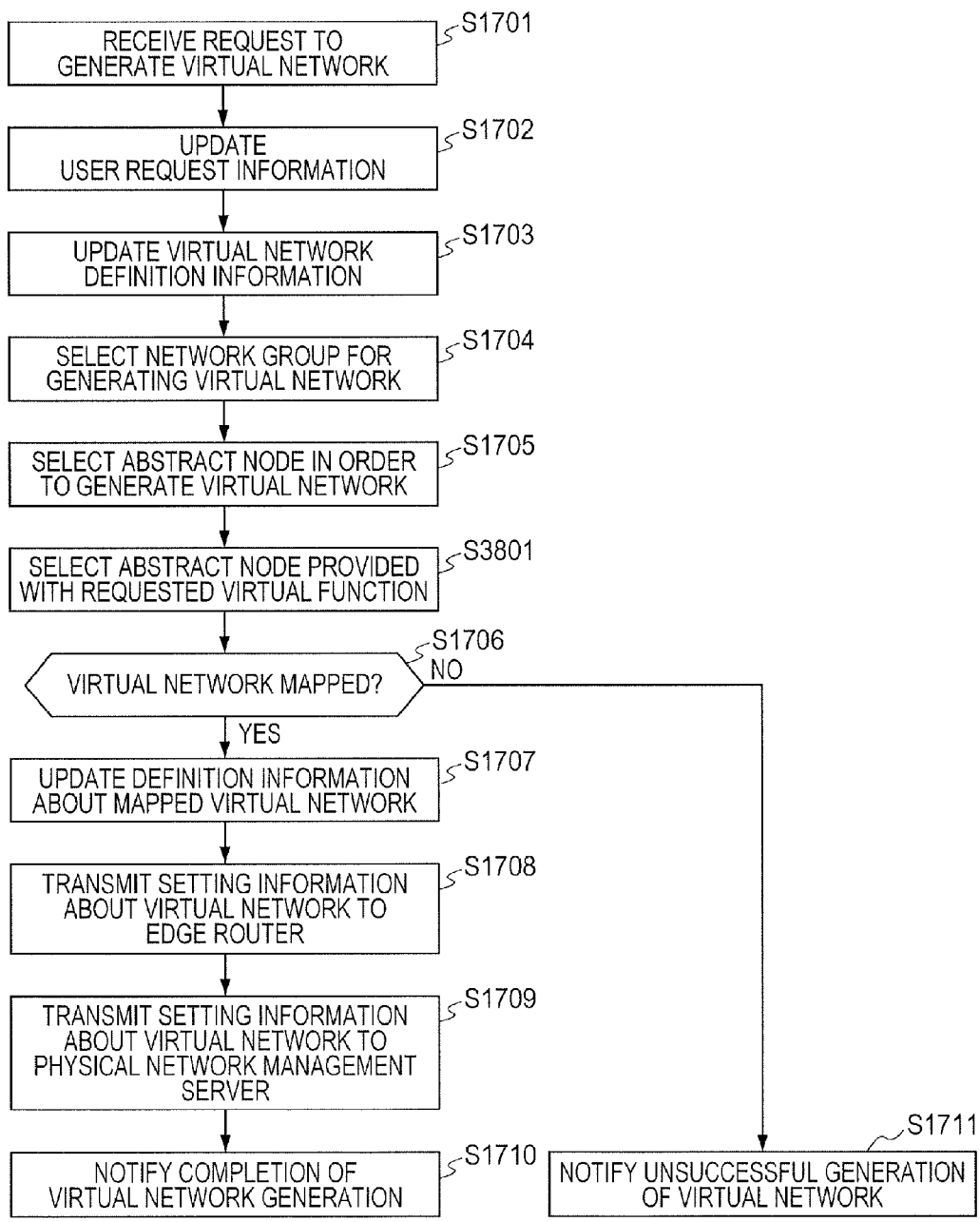
FIG. 42 is a flowchart illustrating an example of a virtual network generation process in the virtual network system according to the third embodiment of the invention.

FIG. 42 is a flowchart illustrating an example process of generating the virtual network 301 in the virtual network system according to the third embodiment of the invention.

Steps 1701 through 1711 equal those in the first embodiment and a description is omitted for simplicity.

After step 1705 according to the third embodiment, the virtual network management server 105 references the abstraction layer information 409 and selects the abstract node 3101 capable of providing the requested virtual function from the abstract nodes 3010 selected at step 1705.

At step 1706, the virtual network management server 105 maps the virtual network 301 based on the network group 701 selected at step 1704 and the abstract node 3101 selected at step 3801.

Fourth Embodiment

The following describes a virtual network system according to the fourth embodiment of the invention.

In the virtual network system according to the fourth embodiment, the function block for the edge router 102 is installed differently from the first embodiment. The following mainly describes differences from the first embodiment.

Figure 43:
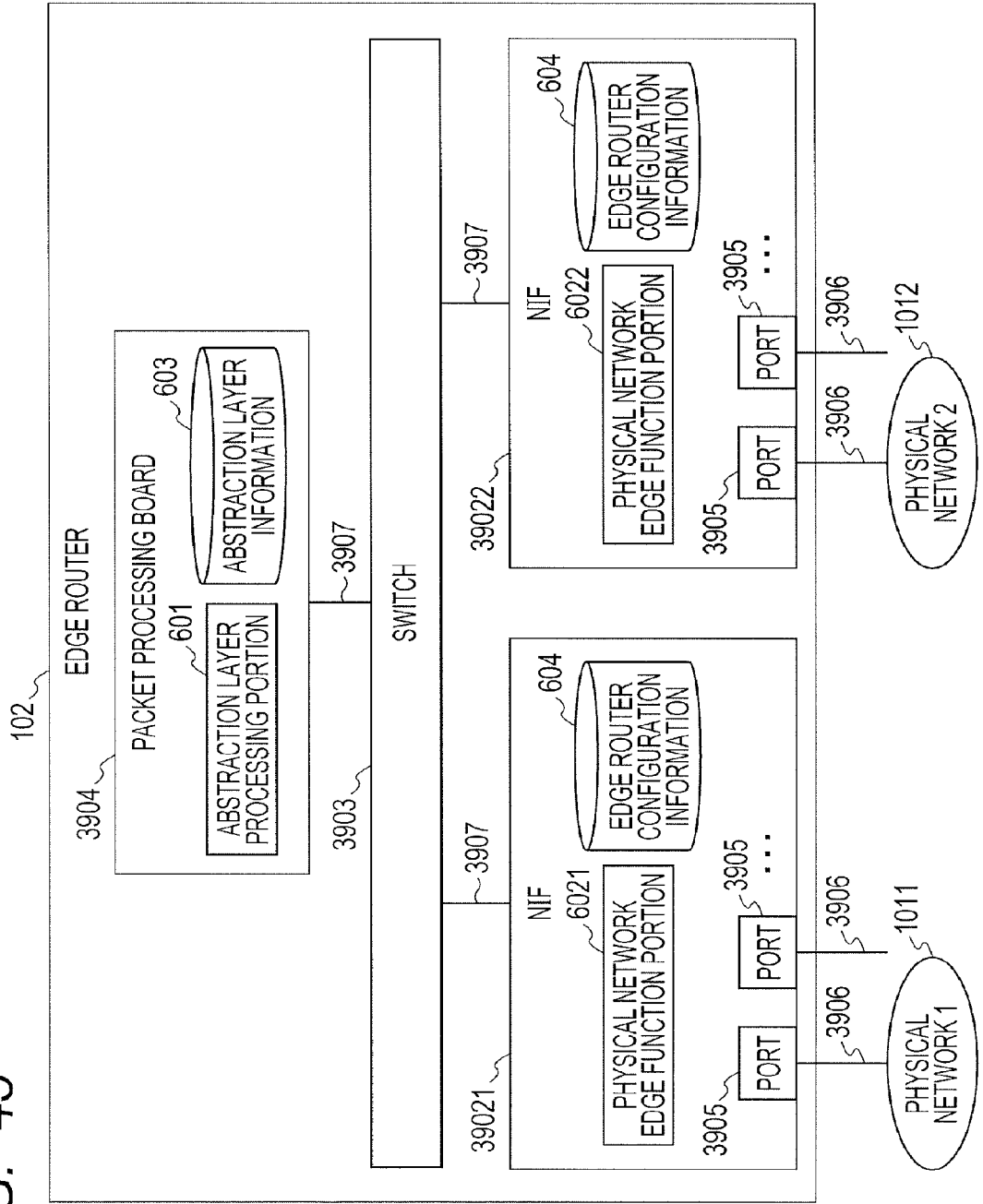
FIG. 43 is a block diagram illustrating an example of installing software for the edge router according to a fourth embodiment of the invention.

FIG. 43 is a block diagram illustrating an example of installing software for the edge router 102 according to the fourth embodiment of the invention.

The edge router 102 according to the fourth embodiment includes multiple physical network edge function portions 602.

In the example of FIG. 43, the edge router 102 is connected to the physical networks 1011 and 1012.

A network interface 39021 is connected to the physical network 1 (1011) and includes a physical network edge function portion 6021 and an edge router configuration information 604 corresponding to the physical network 1 (1011). A network interface 39022 is connected to the physical network 2 (1012) and includes a physical network edge function portion 6022 and an edge router configuration information 604 corresponding to the physical network 2 (1012). The packet processing board 3904 includes the abstraction layer processing portion 601 and the abstraction layer information 603.

Fifth Embodiment

The following describes a virtual network system according to the fifth embodiment of the invention.

In the virtual network system according to the fifth embodiment, the function block for the edge router 102 is installed differently from the first embodiment. The following mainly describes differences from the first embodiment.

Figure 44:
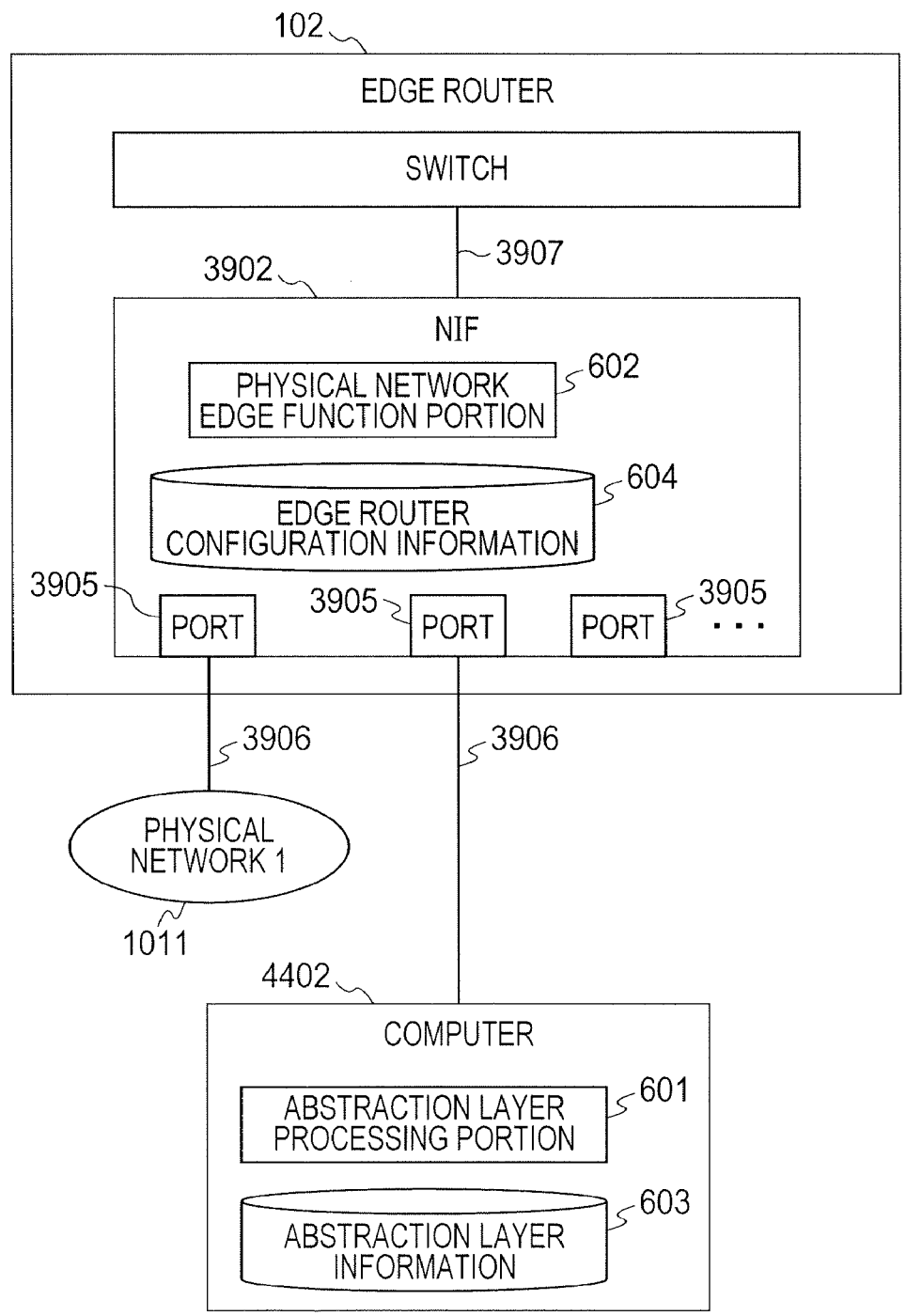
FIG. 44 is a block diagram illustrating an example of installing software for the edge router according to a fifth embodiment of the invention.

FIG. 44 is a block diagram illustrating an example of installing software for the edge router 102 according to the fifth embodiment of the invention.

According to the fifth embodiment, the network interface 3902 of the edge router 102 includes the physical network edge function portion 602 and the edge router configuration information 604 corresponding to the physical network 1 (1011)

A computer 4402 includes the abstraction layer processing portion 601 and the abstraction layer information 603 and is connected to the edge router 102 through the communication cable 3906. The computer 4402 also includes a processor (not shown), memory (not shown), and a network interface (not shown).

In the example of FIG. 44, the edge router 102 does not include the packet processing board 3904 but may include it.

While there have been described specific preferred embodiments of the present invention, it is to be distinctly understood that the present invention is not limited thereto but may be otherwise variously embodied within the spirit and scope of the invention.

The embodiments of the invention provide the following effects.

(1) There may be a case where a virtual network is configured across multiple physical networks that use different methods of configuring and managing the network. In such a case, the virtual network management server 105 can indivisibly manage the virtual network system including multiple physical networks 101 as an abstraction network. The virtual network 301 compliant with operator's requests can be generated on demand.

(2) The virtual network management server 105 can indivisibly manage the virtual network system including multiple physical networks 101 as an abstraction network and therefore manage the overall state of the virtual network 301. Consequently, the virtual network management server 105 can keep track of network states in real time and in detail and provide the highly reliable virtual network 301.

(3) A communication packet uses the abstraction header containing a unique abstraction layer address across the virtual network system including multiple physical networks 101. The abstraction layer address can be used to resolve addresses in the virtual network system. The virtual network system can decrease the amount of information about addresses to be converted in order to resolve addresses. It is possible to reduce costs for the router apparatus and the operation and maintenance control.

What is claimed is:

1. A network system comprising:
a physical network management server that respectively manages a physical network including a plurality of routers; and
a virtual network management server that manages a virtual network, the virtual network being configured over the physical network and coupling a communication system, wherein
the physical network management server is coupled to the virtual network management server,
the virtual network management server:
retrieves physical network configuration information about the physical network from the physical network management server,
generates abstraction network management information configured to manage the physical network as one abstraction network referring to the retrieved physical network configuration information, and
the physical network management server and the routers receive the abstraction network management information generated by the virtual network management server,
the virtual network management server includes virtual network setting information that configures the virtual network,
the abstraction network management information includes information regarding an abstraction node abstracting at least one of the routers that configures the virtual network, and
the virtual network management server:
converts, in response to receipt of a virtual network generation request including input information about the communication system and the router, the input information into virtual network definition information that generates the virtual network,
selects the abstraction node from the abstraction network management information, the abstraction node configuring the virtual network based on the virtual network definition information,
updates the virtual network setting information to configure the virtual network established by the selected abstraction node, and
sends the updated virtual network setting information to the router selected as the abstraction node and the physical network management server identified based on the virtual network setting information.

2. The network system according to claim 1, wherein
the physical network configuration information includes a first location information of the router in the physical network and a first communication function information indicative of a communication function available for the router,
the virtual network management server generates:
abstraction node identification information that uniquely identifies the router as an abstraction node configuring the abstraction network,
second location information of the abstraction node in the abstraction network based on the physical network configuration information,
second communication function information indicative of a communication function available for the abstraction node in the abstraction network based on the physical network configuration information,
network group identification information configured to identify a network group including the abstraction node corresponding to the router included in one of the physical network, and
the abstraction network management information by associating the abstraction node identification information, the second location information, the second communication function information, and the network group identification information, with each other.

3. The network system according to claim 2, wherein
the input information includes:
user identification information about a party requesting generation of the virtual network,
third location information indicative of a location of the communication system in the physical network, and
third communication function information indicative of a communication function used for the virtual network;
the virtual network management server, in converting the input information into the virtual network definition information:
generates virtual network identification information configured to identify the generated virtual network based on the user identification information in the input information,
converts, with reference to the physical network configuration information, the third communication function information in the input information into a fourth communication function information indicative of a communication function available for the abstraction node in the abstraction network,
converts, with reference to the physical network configuration information, the third location information in the input information into fourth location information indicative of a location of the abstraction node in the abstraction network,
generates the virtual network definition information based on the virtual network identification information, the fourth communication function information and the fourth location information,
selects, with reference to the abstraction network management information based on the fourth communication function information, the network group capable of setting the requested virtual network, and
selects, with reference to the abstraction network management information based on the fourth communication function information, the abstraction node capable of configuring the virtual network from the selected network group.

4. The network system according to claim 3, wherein
the virtual network management server:
determines a mapping of the requested virtual network to the abstraction network management information based on the selected network group and the selected abstraction node,
updates the virtual network setting information based on the virtual network identification information, a fifth communication function information indicative of a communication function for a virtual network, and the determined mapping, and
transmits the virtual network setting information to each of the physical network management servers and the routers.

5. The network system according to claim 4, wherein
the physical network configuration information includes first virtual function information indicative of a virtual function that provides a virtual computer or a virtual switch,
the input information includes second virtual function information indicative of a virtual function requested in the virtual network, and
the virtual network management server:
converts, in converting the input information into the virtual network definition information, the second virtual function information in the input information into third virtual function information indicative of the virtual function provided for the abstraction node, and
selects, in selecting the abstraction node from the abstraction network management information, with reference to the abstraction network management information based on the third virtual function information, the abstraction node with the virtual function corresponding to the second virtual function information out of the selected abstraction nodes included in the virtual network.

6. The network system according to claim 2, wherein
the router includes an edge router that couples the physical network with another physical network,
the abstraction network management information and the network setting information are transmitted to the edge router, and
the edge router:
receives the virtual network setting information and then acquires adjacent network group identification information configured to identify the network group including the abstract node corresponding to the other edge router, from the other edge router included in the adjacent physical network, and
transmits the acquired adjacent network group identification information to the virtual network management server, and the virtual network management server stores the adjacent network group identification information transmitted in the abstraction network management information.

7. The network system according to claim 6, wherein the virtual network management server:
generates, after updating the virtual network setting information, first address management information configured to manage a first address indicative of an address of the abstraction node,
transmits the first address management information to the edge router,
acquires second address management information configured to manage a second address indicative of an address of the edge router from each of the physical network management servers and the edge router,
generates routing information in the abstraction network based on the second address management information acquired and the first address management information, and
transmits the generated routing information to the physical network management servers and the edge routers.

8. The network system according to claim 7, wherein the edge router:
analyzes, in response to receipt of a communication packet from the communication system, the received communication packet,
assigns the first address to the received communication packet based on the first address management information and the routing information, and
performs a routing process in the abstraction network based on the first address.

9. The network system according to claim 1, wherein the physical network management server, in response to receipt of the abstraction network management information from the virtual network management server, correlates a router identification information managed thereby to the abstraction network management information received.

10. The network system according to claim 1, wherein the physical network management server:
transmits, in response to an addition of a new router to the physical network managed by the server, to the new router a request configured to acquire configuration information thereof,
acquires the configuration information of the new router therefrom, and
transmits to the virtual network management server the acquired configuration information of the new router as physical network configuration information,
the virtual network management server:
generates the abstraction network management information based on the acquired physical network configuration information, and
transmits the generated abstraction network management information to the new router and the physical network management server managing the physical network including the new router.

11. The network system according to claim 1, wherein the physical network management server:
determines, in response to the receipt of a request to delete the router, whether deleting the router from the physical network influences the virtual network,
changes, in case of a decision that deleting the router makes no influence on the virtual network, the configuration of the physical network, and
deletes the requested router.

12. The network system according to claim 11, wherein the physical network management server requests, in case of a decision that deleting the router influences the virtual network, the virtual network management server to change the virtual network configuration information,
the virtual network management server:
determines, in response to receipt of a request to change the virtual network setting information, whether changing the virtual network setting information influences the virtual network,
determines, in case of a decision that changing the virtual network setting information influences the virtual network, whether to permit the influence on the virtual network,
changes, in case of a decision that the influence on the virtual network is permitted, the virtual network setting information, and
transmits a notification indicating the completion of the change to the physical network management server, and
the physical network management server deletes the requested router in response to receipt of the notification.

13. The network system according to claim 12, wherein the virtual network management server transmits, in case of a decision that the influence on the virtual network is not permitted, an instruction not to delete the requested router.

14. The network system according to claim 1, wherein the virtual network management server:
receives a request to add a new communication system,
determines whether the virtual network setting information can be updated,
determines, in case of a decision that the virtual network setting information can be updated, whether updating the virtual network setting information influences the virtual network,
determines, in case of a decision that changing the virtual network setting information influences the virtual network, whether to permit the influence on the virtual network,
updates, in case of a decision that the influence on the virtual network is permitted, the virtual network setting information, and
transmits the updated virtual network setting information to the physical network management server and to the router.

15. The network system according to claim 14, wherein the virtual network management server notifies, in case of a decision that the influence on the virtual network is not permitted, of an updating failure of the virtual network setting information.

16. A method for managing a network system, the method comprising:
managing a physical network including a plurality of routers, using a physical network management server;
managing a virtual network using a virtual network management server, the virtual network being configured over the physical network and coupling a communication system; and
coupling the physical network management server to the virtual network management server, wherein
the managing the virtual network using the virtual network management server includes:
retrieving physical network configuration information about the physical network from the physical network management server, and generating abstraction network management information configured to manage the physical network as one abstraction network referring to the retrieved physical network configuration information, and the physical network management server and the routers receive the abstraction network management information generated by the virtual network management server, the managing the virtual network using the virtual network management server includes:

converting, in response to receipt of a virtual network generation request including input information about the communication system and at least one of the routers, the input information into virtual network definition information that generates the virtual network, selecting the abstraction node from the abstraction network management information, the abstraction node configuring the virtual network based on the virtual network definition information, updating the virtual network setting information to configure the virtual network established by the selected abstraction node, and sending the updated virtual network setting information to the router selected as the abstraction node and the physical network management server identified based on the virtual network setting information, the virtual network management server includes virtual network setting information that configures the virtual network, and the abstraction network management information includes information regarding an abstraction node abstracting the router that configures the virtual network.

* * * * *